(12) United States Patent
Chang et al.

(10) Patent No.: US 11,757,092 B2
(45) Date of Patent: Sep. 12, 2023

(54) POSITIVE ACTIVE MATERIAL FOR RECHARGEABLE LITHIUM BATTERY, METHOD OF PREPARING THE SAME AND RECHARGEABLE LITHIUM BATTERY INCLUDING THE SAME

(71) Applicant: Samsung SDI Co., Ltd., Yongin-si (KR)

(72) Inventors: Donggyu Chang, Yongin-si (KR);
Donghyun Kil, Yongin-si (KR);
Jongmin Kim, Yongin-si (KR);
Wooyoung Yang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 172 days.

(21) Appl. No.: 16/684,057

(22) Filed: Nov. 14, 2019

(65) Prior Publication Data
US 2020/0161643 A1  May 21, 2020

(30) Foreign Application Priority Data

Nov. 15, 2018 (KR) .......................... 10-2018-0140901

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0471* (2013.01); *H01M 4/502* (2013.01);
(Continued)

(58) Field of Classification Search
CPC .... H01M 4/366; H01M 4/0471; H01M 4/502; H01M 4/505; H01M 4/523; H01M 4/525;
(Continued)

(56) References Cited

U.S. PATENT DOCUMENTS

2006/0051671 A1   3/2006 Thackeray et al.
2008/0311473 A1*  12/2008 Sasaoka ................ H01M 4/364
                                                      429/223
(Continued)

FOREIGN PATENT DOCUMENTS

CN      101080830 A    11/2007
CN      103606674 A    2/2014
(Continued)

OTHER PUBLICATIONS

Yu et al., "Nanofibers of LiMn2O4 by electrospinning", Journal of Colloid and Interface Science, ISSN: 0021-9797, vol. 285, Issue: 1, p. 163-166 (Year: 2005).*

(Continued)

*Primary Examiner* — Matthew T Martin
*Assistant Examiner* — Unique Jenevieve Luna
(74) *Attorney, Agent, or Firm* — Lewis Roca Rothgerber Christie LLP

(57) ABSTRACT

A positive active material for a rechargeable lithium battery includes a lithium nickel-based composite oxide including a secondary particle in which a plurality of plate-shaped primary particles are agglomerated; and a coating layer including a fiber-shaped lithium manganese composite oxide, wherein the fiber-shaped lithium manganese composite oxide is attached to the surface of the lithium nickel-based composite oxide.

17 Claims, 11 Drawing Sheets

(51) Int. Cl.
*H01M 4/50* (2010.01)
*H01M 4/505* (2010.01)
*H01M 4/52* (2010.01)
*H01M 4/525* (2010.01)
*H01M 10/04* (2006.01)
*H01M 10/0525* (2010.01)
*H01M 4/02* (2006.01)

(52) U.S. Cl.
CPC ............ *H01M 4/505* (2013.01); *H01M 4/523* (2013.01); *H01M 4/525* (2013.01); *H01M 10/0422* (2013.01); *H01M 10/0525* (2013.01); *H01M 2004/028* (2013.01)

(58) Field of Classification Search
CPC ......... H01M 10/0422; H01M 10/0525; H01M 2004/028
See application file for complete search history.

(56) References Cited

U.S. PATENT DOCUMENTS

| | | |
|---|---|---|
| 2010/0167078 A1 | 7/2010 | Kim et al. |
| 2011/0311869 A1 | 12/2011 | Oh et al. |
| 2012/0112139 A1 | 5/2012 | Chang et al. |
| 2012/0261610 A1 | 10/2012 | Paulsen et al. |
| 2012/0282522 A1 | 11/2012 | Axelbaum et al. |
| 2012/0292561 A1 | 11/2012 | Sasaoka et al. |
| 2013/0078518 A1 | 3/2013 | Thackeray et al. |
| 2014/0038052 A1 | 2/2014 | Song et al. |
| 2014/0057175 A1 | 2/2014 | Chung et al. |
| 2014/0065483 A1 | 3/2014 | Park et al. |
| 2014/0162119 A1 | 6/2014 | Takei et al. |
| 2015/0016024 A1 | 1/2015 | Choi et al. |
| 2015/0147651 A1 | 5/2015 | Hong et al. |
| 2015/0147655 A1 | 5/2015 | Park et al. |
| 2015/0171423 A1 | 6/2015 | Kim et al. |
| 2015/0243971 A1 | 8/2015 | Cho et al. |
| 2015/0287984 A1 | 10/2015 | Kong et al. |
| 2016/0043396 A1 | 2/2016 | Sakai et al. |
| 2016/0211517 A1 | 7/2016 | Beck et al. |
| 2016/0372748 A1* | 12/2016 | Nakayama .............. H01M 4/485 |
| 2017/0179470 A1 | 6/2017 | Choi et al. |
| 2017/0194637 A1 | 7/2017 | Ahn et al. |
| 2017/0271653 A1* | 9/2017 | Yamauchi .............. H01M 4/525 |
| 2017/0338488 A1 | 11/2017 | Sun et al. |
| 2018/0026267 A1 | 1/2018 | Kim et al. |
| 2018/0026268 A1 | 1/2018 | Kim et al. |
| 2018/0145324 A1 | 5/2018 | Liu et al. |
| 2018/0151876 A1 | 5/2018 | Kim et al. |
| 2018/0159128 A1 | 6/2018 | Kim et al. |
| 2018/0166687 A1 | 6/2018 | Chang et al. |
| 2018/0212237 A1 | 7/2018 | Lee et al. |
| 2019/0173076 A1 | 6/2019 | Kim et al. |
| 2019/0260024 A1* | 8/2019 | Nakamura .............. H01M 4/505 |
| 2019/0288285 A1* | 9/2019 | Kim ........................ H01M 4/131 |
| 2019/0326596 A1 | 10/2019 | Yun et al. |
| 2021/0193999 A1 | 6/2021 | Omae et al. |

FOREIGN PATENT DOCUMENTS

| | | |
|---|---|---|
| CN | 105609718 A * | 5/2016 |
| CN | 105958062 A | 9/2016 |
| CN | 106784659 A * | 5/2017 |
| CN | 106848241 A | 6/2017 |
| CN | 107644982 A | 1/2018 |
| CN | 108075111 A | 5/2018 |
| DE | 102017201313 A1 | 8/2018 |
| EP | 2744021 A1 | 6/2014 |
| EP | 3272710 | 1/2018 |
| EP | 3331065 | 6/2018 |
| EP | 3550640 A1 | 10/2019 |
| EP | 3550641 A1 | 10/2019 |
| EP | 3550643 A1 | 10/2019 |
| JP | 2008-204806 A | 9/2008 |
| JP | 2017-162614 A | 9/2017 |
| JP | 2018-014325 A | 1/2018 |
| KR | 10-2010-0076824 A | 7/2010 |
| KR | 10-1034227 B1 | 5/2011 |
| KR | 10-2011-0097719 A | 8/2011 |
| KR | 10-2014-0018628 A | 2/2014 |
| KR | 10-2014-0025793 A | 3/2014 |
| KR | 10-2014-0058800 A | 5/2014 |
| KR | 10-2015-0008308 A | 1/2015 |
| KR | 10-2015-0026864 A | 3/2015 |
| KR | 10-2015-0061474 A | 6/2015 |
| KR | 10-2015-0070853 A | 6/2015 |
| KR | 10-2015-0100406 A | 9/2015 |
| KR | 10-2016-0026402 A | 3/2016 |
| KR | 10-2016-0083638 A | 7/2016 |
| KR | 10-2017-0078892 A | 7/2017 |
| KR | 10-2017-0079942 A | 7/2017 |
| KR | 10-2017-0124202 A | 11/2017 |
| KR | 10-2018-0010122 A | 1/2018 |
| KR | 10-2018-0010123 A | 1/2018 |
| KR | 10-2018-0062429 A | 6/2018 |
| KR | 10-2018-0063849 A | 6/2018 |
| KR | 10-2018-0063857 A | 6/2018 |
| KR | 10-2018-0063858 A | 6/2018 |
| KR | 10-2018-0063859 A | 6/2018 |
| KR | 10-2018-0063860 A | 6/2018 |
| KR | 10-2018-0065944 A | 6/2018 |
| KR | 10-2019-0065963 A | 6/2019 |
| KR | 10-2019-0092281 A | 8/2019 |
| WO | WO 2011-089958 A1 | 7/2011 |
| WO | WO 2018-020845 A1 | 2/2018 |
| WO | WO 2018-137942 A1 | 8/2018 |

OTHER PUBLICATIONS

Park et al., "Cycle mechanism and electrochemical properties of lithium manganese oxide prepared using different Mn sources" Materials Chemistry and Physics 112 (2008) 696-701 (Year: 2008).*
U.S. Office Action dated Sep. 15, 2021, issued in U.S. Appl. No. 16/682,907 (10 pages).
Thackeray, Michael M., et al., "Advances in manganese-oxide 'composite' electrodes for lithium-ion batteries," Journal of Materials Chemistry, 2005, vol. 15, pp. 2257-2267.
Chinese Office Action, with English translation, dated Sep. 15, 2021, issued in Chinese Patent Application No. 202010078888.6 (27 pages).
Chinese Office Action dated Sep. 18, 2021, issued in Chinese Patent Application No. 201911111056.3 (21 pages).
Korean Office Action dated Sep. 27, 2021, issued in Korean Patent Application No. 10-2019-0014092 (6 pages).
Office Action dated Oct. 26, 2020, of the corresponding Japanese Patent Application No. 2019-206253 (5 pages).
Office Action dated Oct. 26, 2020, of the corresponding Japanese Patent Application No. 2019-207057 (5 pages).
Song, Bohang, et al., "A facile cathode design combining Ni-rich layered oxides with Li-rich layered oxides for lithium-ion batteries," Journal of Power Sources, vol. 325, 2016, 10 pages.
Meng, Yujia, et al., "Synthesis of LiMn2O4 Nano-wires via Flux Method and Their Usage as Cathode Material for Lithium Ion Batteries," Chemical Research in Chinese Universities, 2015, vol. 31, No. 5, pp. 820-824.
Korean Office Action dated Mar. 23, 2021, issued in Korean Patent Application No. 10-2019-0146078 (7 pages).
Korean Office Action dated Mar. 30, 2021, issued in corresponding Korean Patent Application No. 10-2019-0147179 (8 pages).
Extended European Search Report for corresponding European Patent Application No. 20154668.6, dated Jul. 1, 2020, 9 pages.
Kim, Dongham et al., "Composite 'Layered-Layered-Spinel' Cathode Structures for Lithium-Ion Batteries", Journal of the Electrochemcal Society, Nov. 6, 2012, pp. 31-38.
West, W.C. et al., "Preparation of high quality layered-layered composite Li2MnO3—LiMo2 (M=Ni, Mn, Co) Li-ion cathodes by a ball milling-annealing process", Journal of Power Sources, Elsevier SA, CH, vol. 204, Jan. 1, 2012, pp. 200-204.

(56) References Cited

OTHER PUBLICATIONS

Xi, Liujiang et al., "Layered Li2MnO3.3LINi0.5—xMn0.5—xCo2xO2 microspheres with Mn-rich cores as high performance cathode materials for lithium ion batteries", Physical Chemistry Chemical Physics, vol. 15, No. 39, Jan. 1, 2013, pp. 16579-16585.
EPO Extended Search Report dated Apr. 23, 2020, corresponding to European Patent Application No. 19208992.8 (6 pages).
EPO Extended Search Report dated May 6, 2020, for corresponding European Patent Application No. 19209524.8 (5 pages).
Notice of Allowance for U.S. Appl. No. 16/682,907 dated Mar. 10, 2022, 7 pages.
Office Action for Chinese Application No. CN201911111056.3 dated Mar. 23, 2022, 9 pages.
Office Action for Chinese Application No. CN202010078888.6 dated Mar. 28, 2022, 6 pages.
Office Action for U.S. Appl. No. 16/777,744 dated May 10, 2022, 20 pages.
Restriction Requirement for U.S. Appl. No. 16/777,744 dated Apr. 13, 2022, 6 pages.
U.S. Notice of Allowance dated Jan. 18, 2022, issued in U.S. Appl. No. 16/682,907 (7 pages).
U.S. Notice of Allowance dated Jun. 27, 2022, issued in U.S. Appl. No. 16/682,907 (5 pages).
Chinese Office Action, with English translation, dated Sep. 14, 2022, issued in corresponding Chinese Patent Application No. 201911112652.3 (15 pages).
U.S. Final Office Action dated Nov. 9, 2022, issued in U.S. Appl. No. 16/777,744 (20 pages).
U.S. Advisory Action dated Feb. 14, 2023, issued in U.S. Appl. No. 16/777,744 (5 pages).
Chinese Office, with English translation, Action dated Mar. 31, 2023, issued in corresponding Chinese Patent Application No. 201911112652.3 (11 pages).

\* cited by examiner

POSITIVE ACTIVE MATERIAL FOR RECHARGEABLE LITHIUM BATTERY, METHOD OF PREPARING THE SAME AND RECHARGEABLE LITHIUM BATTERY INCLUDING THE SAME

CROSS-REFERENCE TO RELATED APPLICATION

This application claims priority to and the benefit of Korean Patent Application No. 10-2018-0140901 filed in the Korean Intellectual Property Office on Nov. 15, 2018, the entire content of which is incorporated herein by reference.

BACKGROUND

1. Field

One or more aspects of example embodiments of the present disclosure are related to a positive active material for a rechargeable lithium battery, a method of preparing the same, and a rechargeable lithium battery including the same.

2. Description of the Related Art

As portable electronic devices, communication devices, and the like are developed, rechargeable lithium batteries having a high energy density are desired.

An example rechargeable lithium battery includes a positive electrode and a negative electrode, each of which may include an electrode active material layer including an electrode active material formed on an electrode current collector. The positive active material is a material capable of intercalating lithium ions, and may be or include an oxide (such as lithium cobalt oxide ($Li_xCoO_2$), lithium nickel oxide ($Li_xNiO_2$), lithium nickel cobalt oxide ($Li_x(NiCo)O_2$), lithium nickel cobalt manganese oxide ($Li_x(NiCoMn)O_2$), spinel-type lithium manganese oxide ($Li_xMn_2O_4$), and/or manganese dioxide ($MnO_2$)), an olivine-type or NASICON-type phosphate (such as lithium iron phosphate ($Li_xFePO_4$), lithium manganese phosphate ($Li_xMnPO_4$), and/or the like), silicates, a polymer material, and/or the like.

The negative electrode active material is a material capable of intercalating lithium ions, and may be or include lithium metal, an alloy thereof, a polymer material and/or a carbon material, for example a graphite-based material such as artificial or natural graphite, and/or the like), non-graphitizable carbon, graphitizable carbon, carbon nanotubes (CNT), a carbon nanofibers (CNF), carbon nanowalls (CNW), etc.

SUMMARY

One or more embodiments of the present disclosure are directed toward a positive active material for a rechargeable lithium battery having improved charge and discharge capacity, efficiency, and/or cycle-life characteristics by improving lithium diffusion (e.g., lithium diffusion rates) during charge and discharge, mitigating stress related to volume changes, and reducing unreacted residual lithium.

One or more example embodiments of the present disclosure are directed toward a method of preparing the positive active material for a rechargeable lithium battery.

One or more example embodiments of the present disclosure are directed toward a rechargeable lithium battery including the positive active material.

One or more example embodiments of the present disclosure provide a positive active material for a rechargeable lithium battery including a lithium nickel-based composite oxide including a secondary particle in which a plurality of plate-shaped primary particles are agglomerated; and a coating layer including a fiber-shaped lithium manganese composite oxide, wherein the fiber-shaped lithium manganese composite oxide is attached to the surface (outermost surface) of the lithium nickel-based composite oxide (secondary particle).

The fiber-shaped lithium manganese composite oxide may have a diameter of about 2 nm to about 300 nm.

The lithium manganese composite oxide may be a compound represented by Chemical Formula 1:

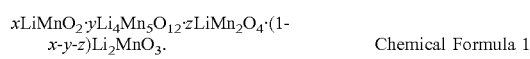

$x$LiMnO$_2 \cdot y$Li$_4$Mn$_5$O$_{12} \cdot z$LiMn$_2$O$_4 \cdot (1-x-y-z)$Li$_2$MnO$_3$.   Chemical Formula 1

In Chemical Formula 1, $0 \le x < 1$, $0 \le y < 1$, $0 \le z < 1$, $0 < y+z < 1$ and $0 < x+y+z < 1$.

The lithium manganese composite oxide may have a cubic crystal lattice structure and a monoclinic crystal lattice structure, and optionally an orthorhombic crystal lattice structure.

The cubic crystal lattice structure may be at least one selected from LiMn$_2$O$_4$ and Li$_4$Mn$_5$O$_{12}$, the monoclinic crystal lattice structure may be Li$_2$MnO$_3$, and the orthorhombic crystal lattice structure may be LiMnO$_2$.

The coating layer may have a thickness of about 2 nm to about 300 nm.

The lithium manganese composite oxide may be included in an amount of about 0.1 wt % to about 5 wt % based on a total weight of the positive active material.

The positive active material may further include lithium manganese composite oxide particles, the lithium manganese composite oxide particles may have an average particle diameter of less than or equal to about 10 μm.

The secondary particle may have a regular array structure in which (003) planes of the primary particles are oriented in a vertical direction with respect to the surface of the secondary particle.

The secondary particle may have a single-centered radial arrangement (e.g., of constituent primary particles) having one center, or a multi-centered radial array structure having a plurality of centers.

The positive active material may include unreacted residual lithium on the surface of the secondary particle in an amount of less than or equal to about 1,300 ppm, and in some embodiments, less than or equal to about 1,000 ppm.

The lithium nickel-based composite oxide may have a porosity of about 1% to about 8%.

The lithium nickel-based composite oxide may have a specific surface area of about 0.3 m$^2$/g to about 0.8 m$^2$/g.

One or more example embodiments of the present disclosure provide a method of preparing the positive active material for a rechargeable lithium battery including: mixing a metal hydroxide precursor and a lithium source to prepare a first mixture; first heat-treating the first mixture under a high temperature condition to prepare a first fired product including residual lithium; mixing the first fired product with manganese-based oxide to prepare a second mixture; and second heat-treating the second mixture to prepare a second fired product.

The first heat-treating may be performed at about 650° C. to about 950° C.

The manganese-based oxide may be mixed in an amount of about 0.1 to about 5 parts by weight based on 100 parts by weight of the first fired product.

The second mixture may further include a second lithium source.

One or more example embodiments of the present disclosure provide a rechargeable lithium battery including the positive electrode including a positive active material; a negative electrode; and an electrolyte between the positive electrode and the negative electrode.

Other specific details of the embodiment of the present invention are included in the detailed description below.

The lithium nickel-based composite oxide including secondary particles including (e.g., consisting of) primary particles with the above-described surface orientation may have improved battery capacity by facilitating movement of lithium between the surface of the positive active material and the electrolyte. Residual lithium content during preparation of the positive active material generated on the surface of the positive active material particle may be reduced when the lithium manganese composite oxide is combined with the lithium nickel-based composite oxide. Thus, it is possible to reduce gas generation and side reactions and obtain a rechargeable lithium battery having phase stability and improved cycle-life and capacity characteristics.

DETAILED DESCRIPTION

Figure 1:
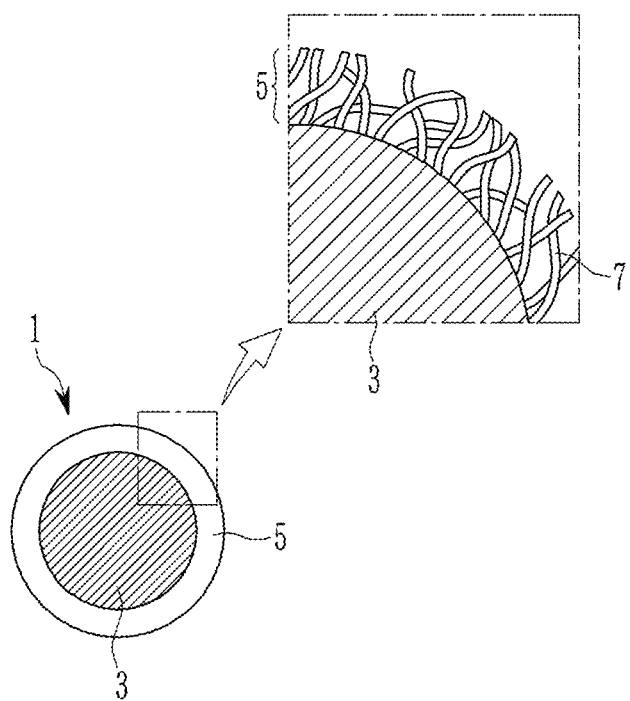
FIG. 1 is a schematic view of a positive active material for a rechargeable lithium battery.

Reference will now be made in more detail to example embodiments, examples of which are illustrated in the accompanying drawings, wherein like reference numerals refer to like elements throughout and duplicative descriptions thereof may not be provided. In this regard, the present example embodiments may have different forms and should not be construed as being limited to the descriptions set forth herein. Accordingly, the example embodiments are merely described below, by referring to the figures, to explain aspects of the present description. The present disclosure is not limited thereto and the present disclosure is defined by the scope of claims.

The thicknesses of layers, films, panels, regions, etc., may be exaggerated in the drawings for clarity. It will be understood that when an element such as a layer, film, region, or substrate is referred to as being "on" another element, it can be directly on the other element or intervening element(s) may also be present. In contrast, when an element is referred to as being "directly on" another element, no intervening elements are present.

Expressions such as "at least one of", "one of", "selected from", "at least one selected from", and "one selected from", when preceding a list of elements, modify the entire list of elements and do not modify the individual elements of the list. Further, the use of "may" when describing embodiments of the present disclosure refers to "one or more embodiments of the present disclosure."

In an embodiment, the terms "size (particle)" and "average particle diameter" may refer to the average particle diameter D50. The average particle diameter D50 represents a particle diameter at 50% volume in a particle volume distribution, as measured using a laser diffraction particle distribution measurement method.

A structure of a positive active material for a rechargeable lithium battery according to an embodiment of the present disclosure is described with reference to FIG. 1. FIG. 1 is a schematic view of a positive active material for a rechargeable lithium battery according to an embodiment of the present disclosure.

Referring to FIG. 1, a positive active material 1 for a rechargeable lithium battery according to an embodiment of the present disclosure includes a lithium nickel-based composite oxide 3 including (e.g., in the form of) a secondary particle in which a plurality of plate-shaped primary particles is agglomerated; and a coating layer 5 including a fiber-shaped lithium manganese composite oxide 7; wherein the fiber-shaped lithium manganese composite oxide 7 is attached to the surface of the lithium nickel-based composite oxide 3.

The lithium nickel-based composite oxide 3 includes the coating layer 5 including the fiber-shaped lithium manganese composite oxide 7 on the surface, and thereby has improved structural stability. For example, although charging and discharging of a rechargeable lithium battery may, in general, cause cracking of the lithium nickel-based composite oxide 3, the lithium manganese composite oxide may suppress such cracking to thereby reduce side reactions with an electrolyte, reduce gas generation, and subsequently improve the charge and discharge characteristics of the cell. In addition, since the lithium manganese composite oxide is formed by reacting residual lithium on the surface of the lithium nickel-based composite oxide with a manganese-based oxide, side reactions of the positive active material with the electrolyte solution may be further suppressed.

In some embodiments, the coating layer 5 may be formed as a uniform coating layer or a non-uniform island type on the surface of the lithium nickel-based composite oxide 3. For example, the footprint of the fiber-shaped lithium manganese composite oxide 7 on the surface of the secondary particle may have a uniform and/or continuous shape, or in some embodiments, a non-uniform and/or discontinuous island shape.

Figure 2A:
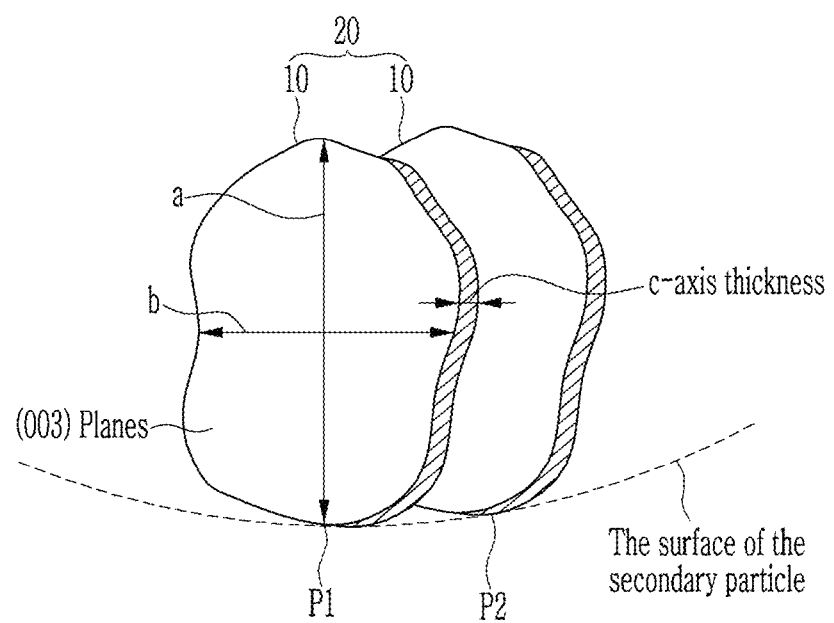
FIG. 2A is a schematic view of oriented primary particles of a lithium nickel-based composite oxide, as included in the positive active material according to embodiments of the present disclosure.

The lithium nickel-based composite oxide includes (e.g., may be in the form of) a secondary particle in which a plurality of plate-shaped primary particles are agglomerated, and the secondary particle of the lithium nickel-based composite oxide may have a regular array structure in which the (003) planes (e.g., (003) planar surfaces) of the primary particles are oriented in a vertical direction with respect to the surface of the secondary particle. Hereinafter, the lithium nickel-based composite oxide is described referring to FIG. 2A. In FIG. 2A, the dimensions of each primary particle 10 can be described in terms of a, b, and c axes, where the "a axis" refers to the longest dimension, the "b axis" refers to the intermediate dimension, and the "c axis" refers to the shortest dimension or thickness of the particle. In some embodiments, the a, b, and c axes additionally correspond to the crystal lattice coordinates (Miller indices) h, k, and l, such that crystal planes normal to e.g., the c axis may be denoted as (001) and may form a planar surface of the primary particle.

Referring to FIG. 2A, the (003) planes of primary particles 10 (see also P1 and P2 as example particles) are oriented in a vertical direction with respect to the surface of the secondary particle (dashed line). As used herein to describe the secondary particle, the term "surface" refers to the outermost surface of the secondary particle (as approximated, for example, as a sphere or ellipsoid enclosing the secondary particle). As used herein to refer to the positioning or orientation of the primary particles, the terms "vertical direction", "normal", and/or "perpendicular" indicate that a long axis (a axis) and a short axis (b axis) of the (003) plane crosses the surface of the secondary particle (e.g., crosses a plane tangent to the surface of the secondary particle at the point of intersection) at an angle of about 70° to about 110°, for example about 80° to about 100°. When the (003) plane of the primary particles 10 is oriented so as to be perpendicular to the surface of the secondary particles 20, a relatively large number of lithium diffusion passages between boundaries are formed on a shell (e.g., on or along the outermost surface and/or portion) of the secondary particles 20, and a lithium diffusion degree (e.g., lithium diffusion rates) may be increased by exposing a large amount (surface area) of the crystal surfaces capable of lithium transfer, thereby securing high initial efficiency and capacity. In addition, the above-described structure may suppress or reduce stress caused by volume changes of the secondary particles 20 during charge and discharge, thereby suppressing or reducing the occurrence of cracks.

As used herein, the term "core" refers to a region of about 65% to about 85% of the length from the to the surface of the secondary particle 20. For example, in the lithium nickel-based composite oxide according to embodiments of the present disclosure, the core, the core may encompass the volume of the secondary particle except for the region within about 2 μm from the outermost surface of the secondary particle. In addition, the term "shell" refers to a region of about 5% to about 15% of the length from the outermost surface of the secondary particle to the center of the lithium nickel-based composite oxide of the secondary particle 20 (e.g., the outer 5% to 15% length of the radius). For example, in the lithium nickel-based composite oxide according to embodiments of the present disclosure, the shell may encompass the volume within 2 μm of the outermost of the lithium nickel-based composite oxide. The term "intermediate layer" refers to the remaining region or volume except for (e.g., not included in) the core and the shell. As used herein, the orientation of the primary particles 10 shown in FIG. 1 may predominantly apply to primary particles in the shells of the secondary particle 20. For example, two or more primary particles 10 in the shell region of the secondary particle 20 may be oriented in a vertical direction (e.g., normal) with respect to the surface of the secondary particle 20.

The secondary particle may have a single-centered radial arrangement (e.g., of constituent primary particles) having one center, or a multi-centered radial array structure having a plurality of centers. For example, the plurality of primary particles 10 may be oriented toward one center so as to form interfacial contacts along the c-axis (thickness) direction of the primary particles 10, thereby providing the secondary particle 20 having a radial array structure.

In another embodiment, the secondary particle 20 may have a multi-centered radial array structure having a plurality of centers. When the secondary particle 20 has a single-centered or multi-centered radial array structure as described above, lithium may be easily intercalated and deintercalated into the center of the secondary particle 20.

Figure 2B:
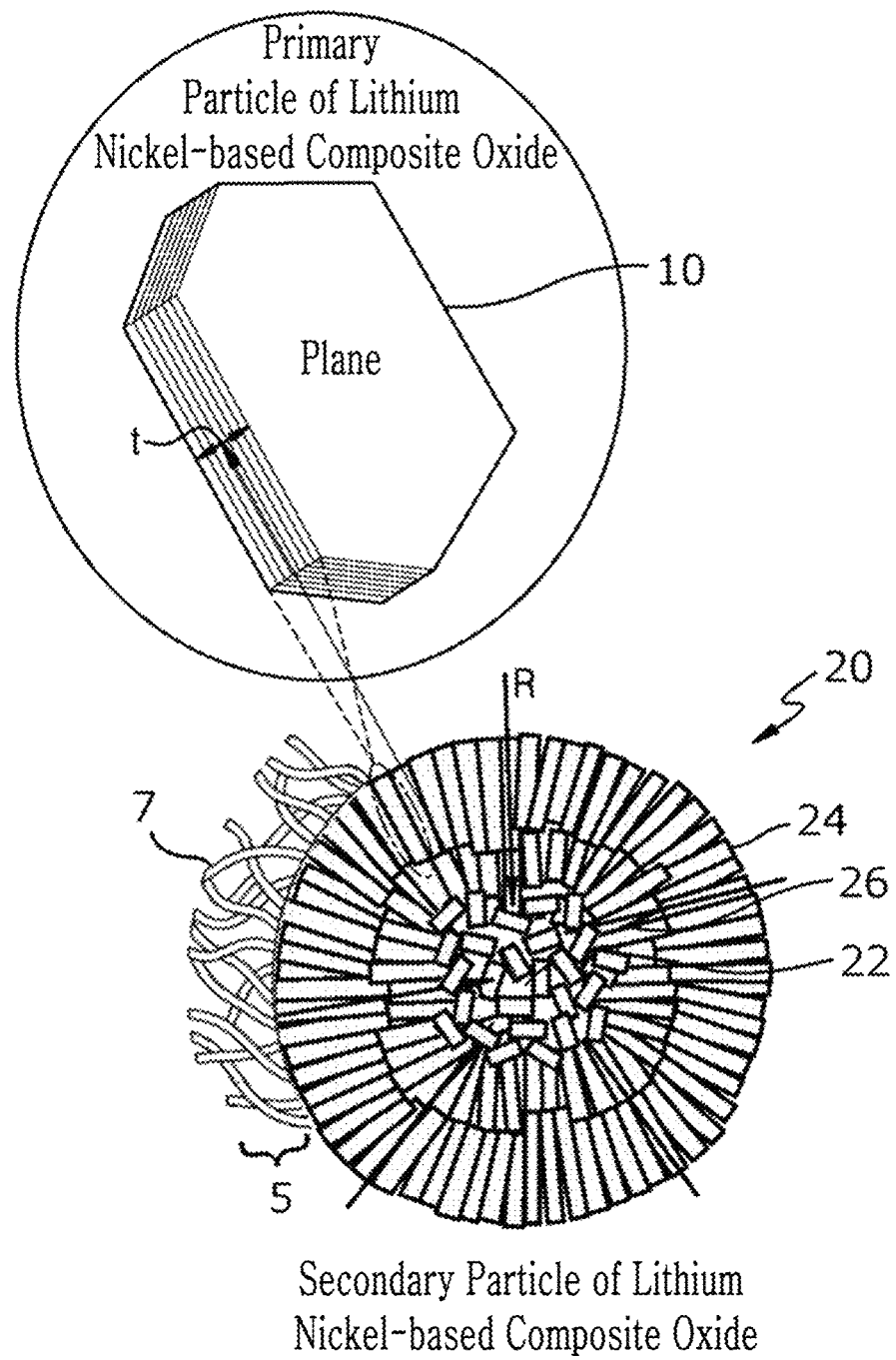
FIG. 2B is a schematic view of a secondary particle 20 in which a plurality of plate-shaped lithium nickel-based composite oxide primary particles 10 are agglomerated, according to embodiments of the present disclosure.

FIG. 2B is a schematic view of a secondary particle 20 in which a plurality of plate-shaped lithium nickel-based composite oxide primary particles 10 are agglomerated, according to embodiments of the present disclosure. The secondary particle 20 includes a core 22, a shell 24, and an intermediate layer 26 between the core 22 and the shell 24. As depicted by the planes within the primary particle 10 shown in the inset, as translated into the context of the secondary particle 20, (003) planes of the primary particles 10 are oriented in a vertical direction with respect to an outermost surface of the secondary particle (e.g., along the direction R). The coating layer 5 including fiber shaped lithium manganese composite oxide 7 is on the outermost surface of the secondary particle 20. While only a portion of the coating layer 5 is shown on the particle in FIG. 2B for clarity, it will be understood that the coating layer 5 and fiber shaped lithium manganese composite oxide 7 are not limited thereto, and for example, may be on the full surface (circumference) on the primary particle 20. FIG. 2B depicts a particle having a single-center radial arrangement structure. However, it will be understood that embodiments of the present disclosure are not limited thereto, and the particle may have a multi-centered radial arrangement structure, as described herein.

The lithium nickel-based composite oxide may be a porous particle including a plurality of pores therein. A total porosity of the particle may be greater than or equal to about 1%, greater than or equal to about 1.5%, greater than or equal to about 2.0%, or greater than or equal to about 2.5%, and less than or equal to about 8% and less than or equal to about 7.5%, less than or equal to about 7.0%, or less than or equal to about 6.5%. The term "porosity" is used herein in the same sense as a pore volume fraction, and is calculated as the ratio of the pore volume to the total particle volume. The lithium nickel-based composite oxide may include pores (e.g., internal pores and/or closed pores) therein and thereby the pores may effectively or suitably accommodate changes in the structure of the positive active material during charge and discharge of the positive active composite material.

The lithium nickel-based composite oxide may have a specific surface area of about 0.3 m²/g to about 0.8 m²/g. An unreacted residual lithium content present on the surface of the positive active material may be less than or equal to about 1,300 ppm, for example less than or equal to about 1,200 ppm, less than or equal to about 1,100 ppm, less than or equal to about 1,000 ppm, or less than or equal to about 955 ppm.

The residual lithium content may be composed of $Li_2CO_3$ and LiOH remaining on the surface of the positive active material after synthesis. In general, a relatively large positive active material particle size is desirable for high battery capacity, but in this case, since the specific surface area is relatively low, the rate capability and initial capacity may be decreased due to a reduction (decrease) of the active area in contact with an electrolyte solution. In order to solve this problem, the positive active material according to an embodiment of the present disclosure is a lithium nickel-based composite oxide including secondary particles in which a plurality of plate-shaped primary particles are agglomerated and arranged as described above, and thus the specific surface area thereof may be relatively increased. However, in this positive active material including secondary particles having a developed surface orientation (e.g., a high degree of vertical alignment with respect to the outermost surface of the secondary particle, as described above), lithium ions may react with moisture and/or $CO_2$ in the air and thus may easily form surface impurities (such as $Li_2CO_3$, LiOH, and/or the like) on the surface of the active material, which may deteriorate battery capacity or be decomposed inside the battery, and thus generate gas and cause a battery swelling phenomenon, resulting in serious problems of deteriorating high temperature stability and/or the like. However, the lithium manganese composite oxide according to embodiments of the present disclosure is prepared by reacting the unreacted residual lithium on the surface of the secondary particles with a manganese-based oxide, thus preventing or reducing the aforementioned problems of the lithium nickel-based composite oxide.

In addition, when the specific surface area of a lithium nickel-based composite oxide with high nickel content is increased, residual lithium inside a cell may react with an electrolyte solution, moisture, and/or air to thus generate gas and shorten a cycle-life of a battery. However, the residual lithium on the surface of the lithium nickel-based composite oxide according to embodiments of the present disclosure is reduced, and thus gas generation may be suppressed, even though the specific surface area is within the above-described range, and accordingly, the capacity and efficiency of the rechargeable lithium battery may be improved.

The lithium nickel-based composite oxide may be a compound represented by Chemical Formula 2.

$$Li_a(Ni_{1-x-y-z}Co_xMn_yM_z)O_2$$

$(0.95 \leq a \leq 1.3, x \leq (1-x-y-z), y \leq (1-x-y-z), 0<x<1, 0\leq y<1, 0\leq z<1)$. Chemical Formula 2

In Chemical Formula 2, M is at least one element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), $0.95 \leq a \leq 1.3$, for example $1.0 \leq a \leq 1.1$, $0<x \leq 0.33$, for example $0.1 \leq x \leq 0.33$, $0 \leq y \leq 0.5$, for example $0.05 \leq y \leq 0.3$, $0 \leq z \leq 0.05$, and $0.33 \leq (1-x-y-z) \leq 0.95$.

In some embodiments, in Chemical Formula 2, $0<x \leq 0.33$, $0 \leq y \leq 0.33$, and $0 \leq z \leq 0.05$. In some embodiments, in Chemical Formula 2, z may be 0. In some embodiments, in Chemical Formula 2, when z is in the range of $0<z \leq 0.05$, M may be aluminum. For example, the lithium nickel-based composite oxide may be $LiNi_{0.6}Co_{0.2}Mn_{0.2}O_2$, $LiNi_{0.5}Co_{0.2}Mn_{0.3}O_2$, $LiNi_{1/3}Co_{1/3}Mn_{1/3}O_2$, $LiNi_{0.8}Co_{0.1}Mn_{0.1}O_2$, or $LiNi_{0.85}Co_{0.1}Al_{0.05}O_2$.

A fiber-shaped lithium manganese composite oxide may be attached on the surface of the lithium nickel-based composite oxide. The lithium manganese composite oxide is coated as a fiber shape (e.g., is a coating layer including fibers and fiber-shaped structures) and thus may have low contact resistance between particles, a large specific surface area, and a well-developed pore structure, for example, compared with a lithium nickel-based composite oxide coated with a thin film or a particle shape on the surface. In some embodiments, for example, at least a portion of the fibers, in terms of concentration and/or the length of each fiber, may extend from the surface of the lithium nickel-based composite oxide in a radial direction, rather than lying along the surface of the particle. Accordingly, lithium ions may move into the lithium nickel-based composite oxide faster and more smoothly, and are more easily intercalated and deintercalated.

The fiber-shaped lithium manganese composite oxide is present on the surface of the lithium nickel-based composite oxide, and thus may effectively block side reactions of the lithium nickel-based composite oxide with an electrolyte solution, increase lithium ion diffusivity, and thus improve the rate capability and output characteristics of the battery due to a reduction in resistance on the surface of the positive active material.

The fiber-shaped lithium manganese composite oxide may have a diameter of about 2 nm to about 300 nm, for example about 2 nm to about 250 nm, about 2 nm to about 200 nm, about 2 nm to about 150 nm, about 2 nm to about 50 nm, or about 2 nm to about 10 nm. Here, the term "diameter" refers to the average diameter of a cross-section of the particle, the cross-section being normal to the length of the particle. When the fiber-shaped lithium manganese composite oxide has a diameter within the above-described ranges, the movement of lithium ions inside the positive active material may be smoother and faster, and intercalation and deintercalation of lithium ions may be facilitated.

The lithium manganese composite oxide may be represented by Chemical Formula 1:

$$xLiMnO_2 \cdot yLi_4Mn_5O_{12} \cdot zLiMn_2O_4 \cdot (1-x-y-z)Li_2MnO_3 \quad \text{Chemical Formula 1}$$

In Chemical Formula 1, $0 \leq x < 1$, $0 \leq y < 1$, $0 \leq z < 1$, $0<y+z<1$ and $0<x+y+z<1$.

For example, the lithium manganese composite oxide may be a composite or mixture of two or more lithium manganese oxide compositions. The lithium manganese composite oxide may have (e.g., be present in) at least two types of crystal lattice structures. In some embodiments, for example, each identifiable lithium manganese oxide composition in the lithium manganese composite oxide may have a crystal lattice structure same or different from the others, with at least two being present. For example, the lithium manganese composite oxide may include a cubic crystal lattice structure and a monoclinic crystal lattice structure, and optionally an orthorhombic crystal lattice structure. Unlike a general lithium nickel-based composite oxide, which has a layered crystal lattice structure (e.g., a layered α-$NaFeO_2$ structure), in which lithium ions tend to diffuse only between separated metal oxide layers, the lithium manganese composite oxide according to an embodiment of the present disclosure may include a cubic crystal lattice structure and a monoclinic crystal lattice structure, and optionally an orthorhombic crystal lattice structure, in which lithium ions may diffuse in three dimensions. Therefore, compared to the two-dimensional movement of lithium ions in the layered crystal lattice structure, the three-dimensional movement or diffusion of lithium ions in the crystal lattice structures of the lithium manganese composite oxide is smoother and faster, thereby facilitating intercalation and deintercalation of lithium ions. In addition, the crystal formation of lithium manganese composite oxide may enable removal of unreacted residual lithium present on the surface of the lithium nickel-based composite oxide, thereby removing a sheet resistance layer, and facilitating intercalation and deintercalation of lithium ions.

The lithium manganese composite oxide having the cubic crystal lattice structure may be at least one selected from $LiMn_2O_4$ and $Li_4Mn_5O_{12}$, the lithium manganese composite oxide having the monoclinic crystal lattice structure may be $Li_2MnO_3$, and the lithium manganese composite oxide having the orthorhombic crystal lattice structure may be $LiMnO_2$. When the lithium manganese composite oxide includes two or more of the above compositions and/or crystal lattice structures, amounts of residual lithium and gas generated at the surface may be reduced, and the cycle-life and capacity characteristics of the rechargeable lithium battery may be improved.

The crystal lattice structure(s) of the lithium manganese composite oxide may be confirmed through transmission electron microscopy (TEM). The surface contents of elements, such as lithium, may be measured through X-ray photoelectron spectroscopy (XPS), transmission electron microscopy, and/or energy dispersive X-ray spectroscopy (EDS). In addition, the amount of residual lithium on the surface of the lithium nickel-based composite oxide may be measured using inductively coupled plasma-atomic emission spectrometer (ICP-AES).

The coating layer may have a thickness of about 2 nm to about 300 nm, for example, about 100 nm to about 300 nm, about 150 nm to about 250 nm, about 150 nm to about 200 nm, or about 180 nm to about 200 nm. When the thickness of the coating layer is within the above-described ranges, phase stability may be secured (e.g., the coating layer and/or its various crystal lattice structures may be structurally stable) and a rechargeable lithium battery with improved cycle-life and capacity characteristics may be obtained.

In addition, the lithium manganese composite oxide may be included in an amount of greater than or equal to about 0.1 wt %, for example, greater than or equal to about 0.2 wt %, greater than or equal to about 0.3 wt %, greater than or equal to about 0.4 wt %, or greater than or equal to about 0.5 wt % based on a total weight (100 wt %) of the positive active material; and less than or equal to about 5 wt %, for example less than or equal to about 4 wt %, less than or equal to about 3 wt %, less than or equal to about 2 wt %, or less than or equal to about 1 wt % based on a total weight (100 wt %) of the positive active material. When the amount of the lithium manganese composite oxide is within the above-described range, the residual lithium may be decreased, and capacity characteristics may be improved.

The positive active material may further include lithium manganese composite oxide particles, and the lithium manganese composite oxide particles may have an average particle diameter of less than or equal to about 10 μm.

The average particle diameter of the lithium manganese composite oxide particles may be less than or equal to about 10 μm, for example less than or equal to about 8 μm, less than or equal to about 5 μm, less than or equal to about 3 μm, or less than or equal to about 1 μm. When the average particle diameter is within the ranges, the lithium manganese composite oxide particles may readily be present on the surface of the lithium nickel-based composite oxide. As a result, it is possible to effectively block a side reaction of the lithium nickel-based composite oxide and electrolyte solution, a diffusion degree of lithium ion is improved and thus rate capability of the battery may be improved, and output characteristics may be improved by reducing a resistance on the surface of the positive active material.

One or more example embodiments of the present disclosure provide a method of preparing the positive active material for a rechargeable lithium battery including: mixing a metal hydroxide precursor and a lithium source to prepare a first mixture; first heat-treating the first mixture under a high temperature condition to prepare a first fired product including residual lithium; mixing the first fired product with manganese-based oxide to prepare a second mixture; and second heat-treating the second mixture to prepare a second fired product.

First, the metal hydroxide precursor is prepared.

The metal hydroxide precursor may be prepared through first, second, and third processes of forming a core, an intermediate layer, and a shell. In the first, second, and third processes, conditions such as a concentration and an input of a metal-containing raw material, a concentration and an input of ammonia water as a complex (complexing) agent, an input of a pH controlling agent, and/or the like may be changed or varied as described herein.

As used herein, the term "core" refers to a region corresponding to about 65 length % to about 85% of the length from the center to the surface of the secondary particle 20 (e.g., the inner 65% to 85% length of the radius). For example, in the metal hydroxide precursor, the core may encompass the volume of the secondary particle except for the region within about 2 μm from the outermost surface of the metal hydroxide precursor particle. In addition, the term "shell" refers to a region of about 5% to about 15% of the length from the outermost surface of the metal hydroxide precursor particle to the center of the metal hydroxide precursor particle (e.g., the outer 5% to 15% length of the radius). For example, in the metal hydroxide precursor according to embodiments of the present disclosure, the shell may encompass the volume within about 2 μm of the outermost surface of the metal hydroxide precursor. The term "intermediate layer" refers to the remaining region or volume except for (e.g., not included in) the core and the shell in the metal hydroxide precursor.

The method of preparing the positive active material according to embodiments of the present disclosure includes a first process of forming the core of the metal hydroxide precursor.

First, the complex agent and the pH controlling agent (e.g., ammonia water) are put in a reactor, and the metal-containing raw materials are added thereto and reacted. If the pH of the reaction mixture in the reactor changes as the reaction progresses, additional amounts of the pH controlling agent may be added thereto to control the pH. In some embodiments, the complex agent may have (be added at) a concentration of about 0.1 M to about 0.7 M, for example, about 0.2 M to about 0.5 M, the input amount of the complex agent may be in a range of about 6 mL/min to about 12 mL/min or about 8 mL/min to about 12 mL/min, the metal-containing raw materials (e.g., lithium and transition metal-containing reactants) may have concentrations of about 0.1 M to about 3.5 M, for example, about 2 M, and the input amounts of the metal-containing raw materials may be about 50 mL/min to about 100 mL/min.

The method of preparing the positive active material according to embodiments of the present disclosure includes a second process of forming the intermediate layer of the metal hydroxide precursor.

The metal-containing raw materials and the complex agent are added to the resultant of the first process to control the pH of the reaction mixture, and then, the second process is performed. For example, in the second process, the input amount and the concentration of the metal-containing raw materials and the complex agent are increased in order to prevent or slow a decrease in the growth rate of particles after reacting the product from the first process for a set or predetermined time. In some embodiments, a concentration of the complex agent may be about 0.3 M to about 1.0 M, the input amount of the complex agent may be about 8 mL/min to about 15 mL/min or about 8 mL/min to about 12 mL/min, the metal-containing raw materials may have concentrations of about 0.1 M to about 3.5 M, for example, about 2 M, and the input amounts of the metal-containing raw materials may be in a range of about 90 mL/min to about 120 mL/min.

The method of preparing the positive active material according to embodiments of the present disclosure includes a third process of forming the shell of the metal hydroxide precursor, thereby fully completing formation of the metal hydroxide precursor.

The input amounts and the concentrations of the metal-containing raw materials and the complex agent are further increased in order to prevent or slow a growth rate decrease of particles after reacting a reaction product from the second process for a set or predetermined time. For example, the concentration of the complex agent may be about 0.35 M to about 1.0 M, the input amount of the complex agent may be about 12 mL/min to about 20 mL/min or about 12 ml/min to about 18 ml/min, the metal-containing raw materials may have concentrations of about 0.1 M to about 3.5 M, for example, about 2 M, and the input amounts of the metal-containing raw materials may be in a range of about 120 mL/min to about 150 mL/min. In some embodiments, the reaction conditions used in the third process may have a large influence on the surface depth of a porous layer of the metal hydroxide precursor.

The first to third processes share the following common conditions.

In each process, the agitation power may be about 0.1 kW/m$^3$ to about 6 kW/m$^3$, for example, about 1 kW/m$^3$ to about 3 kW/m$^3$. In the second and third processes, the agitation power may be decreased compared to the first processes, but the agitation power of the second and third processes may be the same.

The pH of the reaction mixture may be adjusted to a range of about pH 10 to about pH 12. The pH controlling agent may control or modulate the pH of the reaction mixture to control or modulate formation of a precipitate from the reaction mixture. Non-limiting examples of the pH controlling agent include sodium hydroxide (NaOH), sodium carbonate ($Na_2CO_3$), sodium oxalate ($Na_2C_2O_4$), and the like. In some embodiments, the pH controlling agent may be sodium hydroxide (NaOH).

The concentration of the complex agent increases sequentially from the first process to the second process and then the third process and may thus range from about 0.1 M to about 0.7 M. The complex agent plays a role in controlling the rate of precipitate formation in a co-precipitation reaction. In some embodiments, the complex agent may be ammonia water and/or citric acid. In some embodiments, the complex agent may be ammonia water. Any suitable amount of the complex agent may be used in each process according to the principles herein.

The internal porosity of the metal hydroxide precursor particles is affected by the time of applying each process described above.

Since pores between (001) crystal planes are appropriately or suitably maintained due to minimized or decreased exposure of (001) crystal planes, the metal hydroxide precursor may have excellent structural stability.

The metal hydroxide precursor may be represented by $Me(OH)_2$ (wherein Me includes nickel, cobalt, manganese, and M of Chemical Formula 2), for example a compound represented by Chemical Formula 3.

$(Ni_{1-x-y-z}Co_xMn_yM_z)(OH)_2$. Chemical Formula 3

In Chemical Formula 3, M is at least one element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), $x \leq (1-x-y-z)$, $y \leq (1-x-y-z)$, $0<x<1$, $0 \leq y<1$, and $0 \leq z<1$. In some embodiments, in Chemical Formula 3, $0<x \leq 0.33$, $0 \leq y \leq 0.5$, $0 \leq z \leq 0.05$, and $0.33 \leq (1-x-y-z) \leq 0.95$. In some embodiments, in Chemical Formula 3, $0.5 \leq (1-x-y-z) \leq 0.95$. The metal hydroxide precursor represented by Chemical Formula 3 may be, for example at least one of $Ni_{0.6}Co_{0.2}Mn_{0.2}(OH)_2$, $Ni_{0.5}Co_{0.2}Mn_{0.3}(OH)_2$, $Ni_{1/3}CO_{1/3}Mn_{1/3}(OH)_2$, $Ni_{0.8}CO_{0.1}Mn_{0.1}(OH)_2$, and $Ni_{0.85}Co_{0.1}Al_{0.05}(OH)_2$.

Hereinafter, a method of preparing the positive active material for a rechargeable lithium battery is described.

First, the metal hydroxide precursor and a lithium source are mixed to prepare a first mixture. The lithium source may be for example lithium hydroxide, lithium fluoride, lithium carbonate, or a mixture thereof.

A mixing ratio of the lithium source and the metal hydroxide precursor may be stoichiometrically controlled to produce the lithium nickel-based composite oxide of Chemical Formula 2.

The mixing may be dry mixing or may be performed using a mixer (wet mixer) and/or the like. The dry mixing may be performed by milling. The milling may be performed so that the metal hydroxide precursor used as the starting material is hardly deformed (e.g., not subject to pulverization). For this purpose, it is necessary to control a size of the lithium source mixed with the metal hydroxide precursor in advance. The lithium source may have a size (average particle diameter) of about 5 μm to about 20 μm, for example about 10 μm. When the internal temperature of the mixer is increased above 30° C. during the above milling process, the internal temperature of the mixer may be cooled to maintain it at room temperature, 25° C.

The first mixture may be first heat-treated under a high temperature condition to prepare a first fired product.

The first heat-treating may be performed at a high temperature of about 650° C. to about 950° C., for example, about 800° C. to about 900° C. In the first heat-treating, a temperature-increasing rate may be about 1° C./min to about 10° C./min, for example, about 3° C./min to about 10° C./min. The first heat-treating time may be changed depending on the first heat-treating temperature and the like, for example, in a range of about 3 hours to about 10 hours.

The first heat-treating may be performed under an oxidizing gas atmosphere. The oxidizing gas may be oxygen or air and a content ratio of oxygen/inert gas may be, for example, about 20/80 volume % to about 100/0 volume %.

The obtained first fired product may be mixed with a manganese-based oxide in a set or predetermined mole ratio to obtain a second mixture.

The manganese-based oxide may be at least one selected from $Mn_3O_4$, $Mn_2O_3$, and $MnO_2$.

The first fired product may include the lithium nickel-based composite oxide and unreacted residual lithium.

The mixing may be dry mixing or may be performed using a mixer (wet mixer) and/or the like. The dry mixing may be performed by milling.

The manganese-based oxide may be mixed in an amount of about 0.1 to about 5 parts by weight, for example, about 0.3 to about 2 parts by weight based on 100 parts by weight of the first fired product. When the first fired product and the manganese-based oxide are mixed within the above-described range, a reduction effect of the unreacted residual lithium is improved, and increased capacity and structural stability of a rechargeable lithium battery may be secured.

In some embodiments, the second mixture may further include a lithium source. When the metal hydroxide precursor has a low nickel content, the amount of residual lithium may be low, and the second mixture may be additionally mixed with the same lithium source that used in the first mixture, and the lithium source may react with the manganese-based oxide.

The second mixture is subjected to second heat-treating to prepare a second fired product. The second heat-treating may be performed under an air atmosphere. The atmospheric gas may be dry air or $CO_2$-removed dry air having a content ratio of oxygen/inert gas of 20/80 volume %.

The second heat-treating may be, for example, performed at about 300° C. to about 600° C., for example about 350° C. to about 500° C. or about 370° C. to about 450° C. The rate of temperature-increase during the second heat-treating may be about 1° C./min to about 10° C./min, for example 3° C./min to about 10° C./min. The second heat-treating time is variable, and for example, may be about 3 hours to 10 hours. When the second heat-treating temperature is in the above-described range, a reduction effect of unreacted residual lithium may be improved and the lithium manganese composite oxide may be easily formed, thereby ensuring structural stability of the positive active material.

The positive electrode and the negative electrode according to embodiments of the present disclosure may be formed by applying a composition for forming a positive active material layer and a composition for forming a negative active material layer to respective current collectors, and drying each composition.

The composition for forming the positive active material layer may be formed by mixing a positive active material, a conductive agent, a binder, and a solvent, wherein the positive active material is as described above.

The binder is a component that assists in binding of the active material to the conductive agent and to the current collector. The binder may be added in an amount of about 0.5 to about 50 parts by weight based on a total weight of 100 parts by weight of the positive active material. Non-limiting examples of the binder include polyvinylidene fluoride, polyvinyl alcohol, carboxylmethyl cellulose (CMC), starch, hydroxypropyl cellulose, regenerated cellulose, polyvinylpyrrolidone, polytetrafluoroethylene, polyethylene, polypropylene, an ethylene-propylene-diene terpolymer (EPDM), sulfonated EPDM, a styrene butadiene rubber, a fluoro rubber, and various copolymers. An amount of the binder may be about 1 to about 5 parts by weight based on a total weight of 100 parts by weight of the positive active material. When the amount of the binder is in the above-described range, a binding force of the active material layer to the current collector may be improved.

The conductive agent is not particularly limited as long as it has electron conductivity without causing unwanted chemical changes (reactions) in the battery. Non-limiting examples include for example, graphite (such as natural graphite and artificial graphite); a carbon-based material (such as carbon black, acetylene black, Ketjenblack, channel black, furnace black, lamp black, thermal black and/or the like); a conductive fiber (such as a carbon fiber and/or a metal fiber); carbon fluoride; a metal powder (such as aluminum and/or a nickel powder); a conductive whisker (such as zinc oxide and/or potassium titanate); a conductive metal oxide (such as titanium oxide); and a conductive material (such as a polyphenylene derivative). An amount of the conductive agent may be about 0.5 to about 5 parts by weight based on a total weight of 100 parts by weight of the positive active material. When the amount of the conductive agent is in the above-described range, the conductivity of the finally obtained electrode may be improved.

Non-limiting examples of the solvent include N-methylpyrrolidone and the like. An amount of the solvent may be about 10 to about 100 parts by weight based on 100 parts by weight of the positive active material. When the amount of the solvent is in the range, the active material layer may be easily formed.

The positive current collector may be about 3 μm to about 500 μm thick and is not particularly limited as long as it has high conductivity without causing unwanted chemical changes (reactions) in the battery. Non-limiting examples of the material for the positive current collector include stainless steel, aluminum, nickel, titanium, heat-treated carbon, and/or aluminum and/or stainless steel that has been surface-treated with carbon, nickel, titanium, silver, and the like. The current collector may include a fine concavo-convex microtexture on its surface to enhance adherence of positive active materials and may be in any suitable form (such as a film, a sheet, a foil, a net, a porous body, a foam, and/or a nonwoven fabric body).

A composition for forming a negative active material layer is prepared by mixing a negative active material, a binder, a conductive agent, and a solvent. The negative active material is a material capable of intercalating and releasing (deintercalating)lithium ions. Non-limiting examples of the negative active material include a carbon-based material (such as graphite and/or carbon), a lithium metal, an alloy thereof, and a silicon oxide-based material. In some embodiments, silicon oxide may be used.

The binder, the conductive agent, and the solvent may be the same types or kinds of materials as described for the positive electrode. The binder may be added in an amount of about 1 to about 50 parts by weight based on a total weight of 100 parts by weight of the negative active material. The conductive agent may be added in an amount of about 1 to about 5 parts by weight based on a total weight of 100 parts by weight of the negative active material. When the amount of the conductive agent is within the above-described range, the conductivity characteristics of the finally obtained electrode may be improved. An amount of the solvent may be about 10 to about 100 parts by weight based on a total weight of 100 parts by weight of the negative active material. When the amount of the solvent is within the above-described range, the negative active material layer may be easily formed.

The negative current collector may be about 3 μm to about 500 μm thick. The material for the negative current collector is not particularly limited as long as it has high conductivity without causing unwanted chemical changes (reactions) in the battery and may be, for example, copper, stainless steel, aluminum, nickel, titanium, heat-treated carbon, copper and/or stainless steel that has been surface-treated with carbon, nickel, titanium, silver, and/or the like, an aluminum-cadmium alloy, and/or the like. In addition, the negative current collector may include a fine concavo-convex micro-texture on its surface to enhance adherence of negative active materials, and may be in any suitable form (such as a film, a sheet, a foil, a net, a porous body, a foam and a nonwoven fabric body), similar to the positive current collector.

A separator is positioned between the positive electrode and the negative electrode. The separator may have a pore diameter of about 0.01 μm to about 10 μm and a thickness of about 5 μm to about 300 μm. Non-limiting examples of the material for the separator include polypropylene, an olefin based polymer (such as polyethylene and/or the like); or a sheet made of a glass fiber and a non-woven fabric. When a solid electrolyte (such as a polymer) is used as the electrolyte, the solid electrolyte may also serve as a separator.

The electrolyte may be a non-aqueous electrolyte including a non-aqueous solvent and a lithium salt, an organic solid electrolyte, an inorganic solid electrolyte, and/or the like. The non-aqueous solvent may be for example, a aprotic organic solvent (such as N-methyl-2-pyrrolidinone, propylene carbonate, ethylene carbonate, butylene carbonate, dimethyl carbonate, diethyl carbonate, gamma-butyro lactone, 1,2-dimethoxyethane, 2-methyl tetrahydrofuran, dimethylsulfoxide, 1,3-dioxolane, formamide, N,N-dimethyl formamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, ethyl propionate, and/or the like). The lithium salt is dissolved in the non-aqueous solvent and non-limiting examples thereof include LiCl, LiBr, LiI, LiClO4, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, a lower aliphatic lithium carboxylate, tetraphenyl lithium borate, a lithium imide, and/or the like.

Non-limiting examples of the organic solid electrolyte include a polyethylene derivative, a polyethylene oxide derivative, a polypropylene oxide derivative, a phosphoric acid ester polymer, polyester sulfide, polyvinyl alcohol, polyvinylidene fluoride, and the like.

Non-limiting examples of the inorganic solid electrolyte include $Li_3N$, LiI, $Li_5NI_2$, $Li_3N$—LiI—LiOH, $Li_2SiS_3$, $Li_4SiO_4$, $Li_4SiO_4$—LiI—LiOH, $Li_3PO_4$—$Li_2S$—$SiS_2$, and the like.

Figure 3:
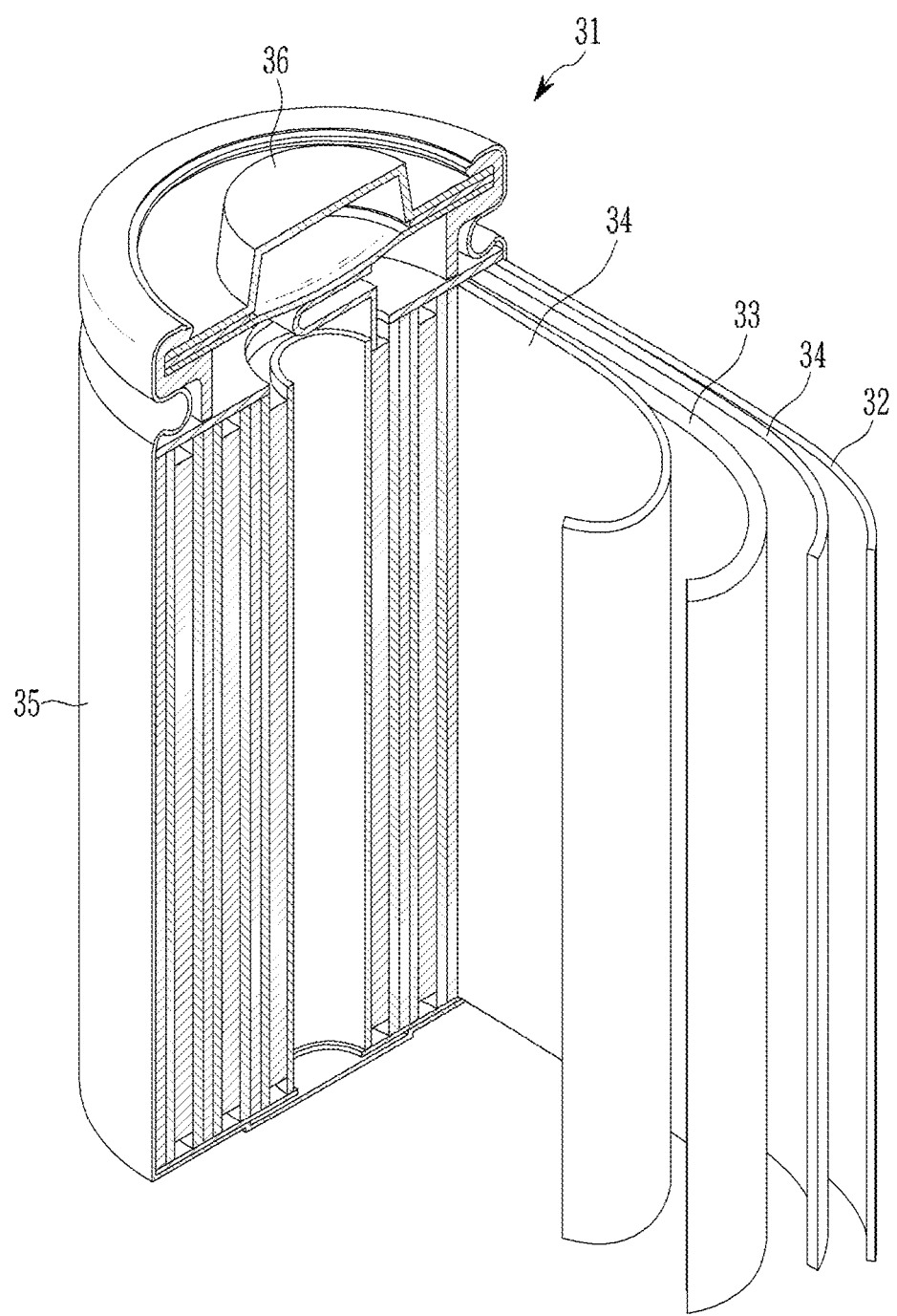
FIG. 3 is a perspective schematic view of a representative rechargeable lithium battery.

FIG. 3 is a perspective schematic view of a representative structure of a rechargeable lithium battery.

Referring to FIG. 3, a rechargeable lithium battery 31 includes a positive electrode 33 including the positive active material according to an embodiment of the present disclosure, a negative electrode 32, and a separator 34. The above-described positive electrode 33, the negative electrode 32, and the separator 34 are wound or stacked and housed in a battery case 35. Then, an organic electrolyte solution (of electrolyte) is injected and sealed in the battery case 35 using the cap assembly 36 to complete a rechargeable lithium battery 31. The battery case 35 may be cylindrical, prismatic, thin film-type, and/or the like.

The rechargeable lithium battery may be a lithium ion battery.

The rechargeable lithium battery may form a battery pack with a circuit, and a single pack or multiple packs may be used for devices requiring high capacity and high power, as needed. For example, the battery pack may be used for a laptop, a smart phone, electric vehicle, etc. The rechargeable lithium battery has excellent storage stability at high temperatures, cycle-life characteristics, and high-rate characteristics, and thus may be suitably used in an electric vehicle (EV). For example, the battery pack may be used for a hybrid vehicle such as a plug-in hybrid electric vehicle (PHEV).

The present disclosure is explained in more detail in the following examples and comparative examples. It is to be understood, however, that the examples are provided for the purpose of illustration and are not to be construed as limiting the present disclosure.

EXAMPLES

Example 1

Example 1-1: Synthesis of Metal Hydroxide Precursor ($Ni_{0.6}Co_{0.2}Mn_{0.2}$ $OH)_2$ A metal hydroxide precursor ($Ni_{0.6}Co_{0.2}Mn_{0.2}(OH)_2$) was synthesized through the co-precipitation method described below. In the following preparing process, a 2M aqueous solution including nickel (II) sulfate, cobalt (II) sulfate, and manganese (II) sulfate was used as metal-containing raw materials for forming the metal hydroxide precursor.

[First Process: 250 rpm, $NH_3·H_2O$ 0.50 M, pH 11.4-11.6]

First, ammonia water with a concentration of 0.50 mol/L was added to the reactor. The reactor was programmed with an agitation power of 250 kW/m$^3$ and a reaction temperature of 50° C., and then, the metal-containing raw materials and ammonia water were added to the reactor at 6.0 mL/min and 1.35 mL/min, respectively. Subsequently, NaOH was added thereto in order to maintain pH (e.g., maintain a pH between 11.4-11.6), and the reaction was performed for 33 hours.

[Post Process]

A post process was performed by washing the resultant and drying it with hot air at about 150° C. for 24 hours to obtain a metal hydroxide precursor ($Ni_{0.6}Co_{0.2}Mn_{0.2}(OH)_2$).

Example 1-2: Preparation of Positive Active Material

A first fired product including a lithium nickel-based composite oxide, $LiNi_{0.6}Co_{0.2}Mn_{0.2}O_2$, was obtained by mixing LiOH as a lithium source and the metal hydroxide precursor of $Ni_{0.6}Co_{0.2}Mn_{0.2}(OH)_2$ according to Example 1-1 in the same mole ratio, and then performing a first heat treatment. The first heat-treatment was performed by increasing the temperature from 25° C. to 850° C. at a rate of 2.0° C./min, maintaining the temperature at 850° C. for 6 hours, and decreasing the temperature from 850° C. to 25° C. at a rate of 2.0° C./min.

100 parts by weight of the first fired product and 2 parts by weight of $Mn_2O_3$ were mixed to obtain a second mixture, and the second mixture was second heat-treated to obtain a positive active material. The second heat-treatment was performed by increasing the temperature from 25° C. to 400° C. at a rate of 5.0° C./min, maintaining the temperature at 400° C. for 6 hours, and decreasing the temperature from 400° C. to 25° C. at a rate of 5.0° C./min.

Example 1-3: Manufacture of Coin Cell

The prepared positive active material, a carbon black carbon conductive agent (Denka Black, Denka Korea Co., Ltd.), and polyvinylidene fluoride (PVdF) were mixed in a weight ratio of 92:4:4, and then mixed with N-methylpyrrolidone (NMP) to prepare a slurry. The slurry was bar-coated on a 15 μm-thick aluminum current collector, dried at room temperature and again at 120° C. under vacuum, and then compressed and punched to manufacture a 25 μm-thick positive electrode plate.

The positive electrode plate was used along with lithium metal as a counter electrode, a PTFE separator, and a solution prepared by dissolving 1.3 M LiPF$_6$ in a mixed solvent of EC (ethylene carbonate), DEC (diethyl carbonate), and EMC (ethylmethyl carbonate) (in a volume ratio of 3:4:3) as an electrolyte to manufacture a coin cell.

Example 2

Example 2-1: Synthesis of Metal Hydroxide Precursor (Ni$_{0.6}$Co$_{0.2}$Mn$_{0.2}$(OH)$_2$)

In the following preparing process, nickel (II) sulfate, cobalt (II) sulfate, and manganese (II) sulfate were used as metal-containing raw materials for forming the metal hydroxide precursor.
[First Process: 1.5 kW/m$^3$, NH$_3$·H$_2$O 0.30 M, pH 10 to 11, Reaction Time 6 Hours]
First, ammonia water (NH$_3$·H$_2$O) having a concentration of 0.30 M was put in a reactor. The metal-containing raw materials and a complex agent (ammonia water) were added thereto at 90 mL/min and 10 mL/min, respectively, at 50° C. under an agitation power of 1.5 kW/m$^3$, thereby starting a reaction. NaOH was added thereto to maintain pH (e.g., maintain a pH between 10-11), and the reaction was performed for 6 hours. The core particles obtained as a reaction result had an average size (diameter) of about 5.5 μm to 6.5 μm and were subsequently used in a second process.
[Second Process: 1.0 kW/m$^3$, NH$_3$·H$_2$O 0.35 M, pH 10 to 11, Reaction Time 6 Hours]
The metal-containing raw materials and the complex agent were added thereto at 100 mL/min and 15 mL/min, respectively, while the reaction temperature was maintained at 50° C., such that the complex agent maintained a concentration of 0.35 M. NaOH was added thereto in order to maintain pH, and the reaction was performed for 6 hours. Herein, the reaction was performed at a lower agitation power of 1.0 kW/m$^3$ (compared to 1.5 kW/m$^3$ during the first process). Particles having a core and an intermediate layer produced from this reaction had an average size of 9 μm to 10 μm. A third process was subsequently performed as follows.
[Third Process: 1.0 kW/m$^3$, NH$_3$·H$_2$O 0.40 M, pH 10 to 11, Reaction Time 4 Hours]
The metal-containing raw materials and the complex agent were added thereto at 150 mL/min and 20 mL/min, respectively, while the reaction temperature was maintained at 50° C., so that the complex agent maintained a concentration of 0.40 M. NaOH was added thereto in order to maintain pH, and the reaction was performed for 4 hours. Herein, the agitation power was maintained to be equal to that used in the second process.
[Post Process]
As for a post process, the resulting material was washed and hot air-dried at about 150° C. for 24 hours to obtain a metal hydroxide precursor (Ni$_{0.6}$CO$_{0.2}$Mn$_{0.2}$(OH)$_2$).

Example 2-2: Preparation of Positive Active Material

A positive active material was manufactured according to substantially the same method as Example 1 (Example 1-2), except for using the metal hydroxide precursor according to Example 2-1.

Example 2-3: Manufacture of Coin Cell

A coin cell was manufactured according to substantially the same method as Example 1 (Example 1-3), except that a positive active material was prepared using the positive active material according to Example 2-2.

Comparative Example 1

A coin cell was manufactured according to substantially the same method as Example 1, except that 100 parts by weight of the first fired product was mixed with 2 parts by weight of Al$_2$O$_3$ instead of Mn$_2$O$_3$ to obtain a second mixture, and a second heat-treating temperature was 700° C. to prepare a positive active material on the surface of which Al$_2$O$_3$ was uniformly coated (film-coated).

Comparative Example 2

A coin cell was manufactured according to substantially the same method as Example 1, except that 100 parts by weight of the first fired product was mixed with 2 parts by weight of zirconium oxide (ZrO$_2$) instead of Mn$_2$O$_3$ to obtain a second mixture, and a second heat-treating temperature was 600° C. to prepare a positive active material on the surface of which zirconium oxide (ZrO$_2$) was uniformly coated in a form of a particle (particle-coated, e.g., the coating was in the form of a plurality of particles or particle-shaped structures).

Comparative Example 3

A coin cell was manufactured according to substantially the same method as Comparative Example 1, except that the metal hydroxide precursor according to Example 2-1 was used to prepare a positive active material on the surface of which Al$_2$O$_3$ was uniformly coated (film-coated, e.g., the coating was in the form of a film).

Evaluation Example 1: Evaluation of Residual Lithium Content

Unreacted residual lithium present on the surfaces of the positive active materials according to Example 1, Example 2, Comparative Example 2, and Comparative Example 3 were measured using a HCl titration method, and the results are shown in Table 1.

The unreacted residual lithium contents were measured using the following method. 10 g of a positive active material was put in distilled water and stirred at 300 rpm for 30 minutes, and then an aliquot was taken therefrom, and a pH change thereof was measured while HCl was added thereto. Since the unreacted residual lithium was present as Li$_2$CO$_3$ and LiOH (having a 1:1 ratio of Li$^+$ to CO$_3^{2-}$ and OH$^-$ counter-anions), HCl was added to react with the CO$_3^{2-}$ and OH$^-$ ions to reach a titration point, and the content of unreacted residual lithium could be calculated from the amount of added HCl solution.

TABLE 1

| | Residual lithium content (Li content) [ppm] |
|---|---|
| Example 1 | 803 |
| Example 2 | 954 |

TABLE 1-continued

| | Residual lithium content (Li content) [ppm] |
|---|---|
| Comparative Example 2 | 1559 |
| Comparative Example 3 | 1467 |

In Examples 1 and 2, the amounts of unreacted residual lithium were greatly reduced by the fiber-shaped coating layer including the fiber-shaped lithium manganese composite oxide according to embodiments of the present disclosure, but in Comparative Example 2 including a coating layer including ZrO$_2$ in the form of a plurality of particles and Comparative Example 3 including a thin-film coating layer including aluminum oxide, the amounts of unreacted residual lithium were relatively less reduced.

Evaluation Example 2: Evaluation of High Temperature Gas Generation Amount

Figure 4:
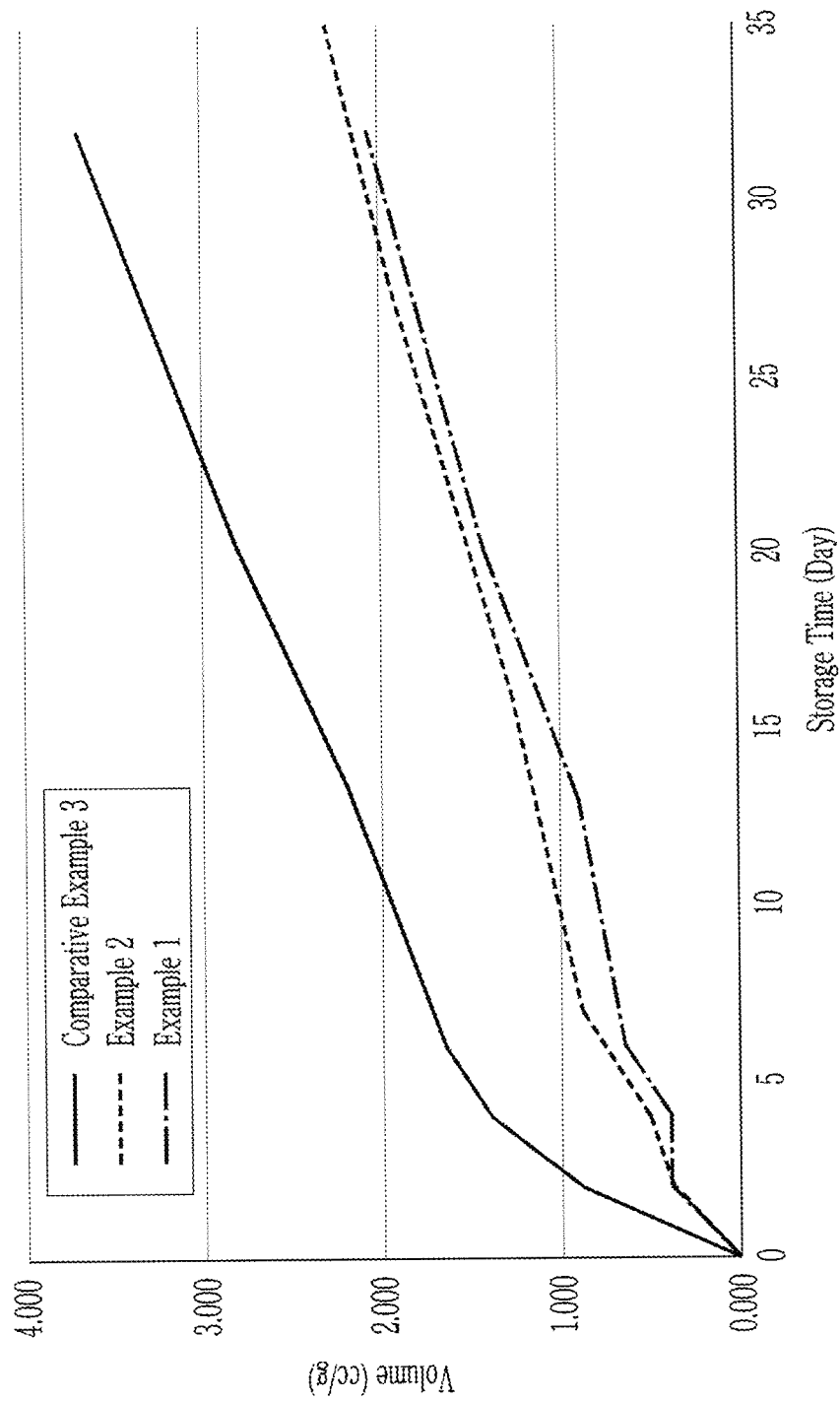
FIG. 4 is a graph of cumulative gas generation amounts over time during storage of the positive electrodes of the coin cells according to Example 1, Example 2, and Comparative Example 3 at high temperature.

The coin cells according to Examples 1 and 2 and Comparative Example 3 were charged under a constant current at 0.1 C up to a voltage of 4.3 V (vs. Li), and subsequently charged with a cut-off current at 0.05 C, while maintaining the cell at 4.3 V in constant voltage mode at room temperature (25° C.). Subsequently, the coin cells were discharged to a voltage of 3.0 V (vs. Li) under a constant current of 0.1 C, thus completing the 1st cycle. In the 2nd cycle, the coin cells were charged under a constant current up to 4.3 V (vs. Li) at 0.1 C at 25° C., charged with a cut off current of 0.05 C, while maintaining the cell at 4.3 V in the constant voltage mode. The cell was then disassembled, the electrode plates taken therefrom were each inserted in a pouch filled with electrolyte solution and stored in an 80° C. oven, the volume change of each pouch was measured and converted into a mass using an Archimedes (e.g., volume displacement) method, and the results are shown in FIG. 4. Meanwhile, the electrolyte was prepared by dissolving 1.3 M LiPF$_6$ in a mixed solvent of EC (ethylene carbonate), DEC (diethyl carbonate), and EMC (ethylmethyl carbonate) (in a volume ratio of 3:4:3).

Referring to FIG. 4, Comparative Example 3 generated an increased amount of gas due to reactions of residual lithium on the surface of the positive active material, resulting in battery swelling.

Examples 1 and 2 exhibited decreased amounts of gas generation during the storage at a high temperature.

Evaluation Example 3: Evaluation of Charge and Discharge Characteristics

The coin cells according to Examples 1 and 2 and Comparative Examples 1 to 3 were charged under a constant current up to a voltage of 4.3 V (vs. Li) at 0.1 C and subsequently charged with a cut off current at 0.05 C, while maintaining the cell at 4.3 V in constant voltage mode, at 25° C. Subsequently, the coin cells were discharged to a voltage of 3.0 V (vs. Li) under a constant current of 0.1 C (1st cycle). The initial charge and discharge efficiency was then calculated according to Equation 1. The results of Example 2 and Comparative Examples 1 and 2 are shown in Table 1.

Initial charge and discharge efficiency (I.C.E)=[first discharge capacity/first charge capacity]×100   Equation 1

TABLE 2

| | Example 2 | Comparative Example 1 | Comparative Example 2 |
|---|---|---|---|
| Charge capacity (mAh/g) | 197 | 198 | 198 |
| Discharge capacity (mAh/g) | 189 | 178 | 178 |
| I.C.E. (%) | 95.9 | 89.9 | 89.9 |

As shown in Table 2, the rechargeable lithium battery cell including the positive active material according to Example 2 exhibited improved initial charge and discharge efficiency compared with the rechargeable lithium battery cell including the positive active material whose surface was coated with an aluminum oxide according to Comparative Example 1, as well as the rechargeable lithium battery cell including the positive active material whose surface was coated with a zirconium oxide according to Comparative Example 2.

Evaluation Example 4: Evaluation of Cycle-life Characteristics

Figure 5:
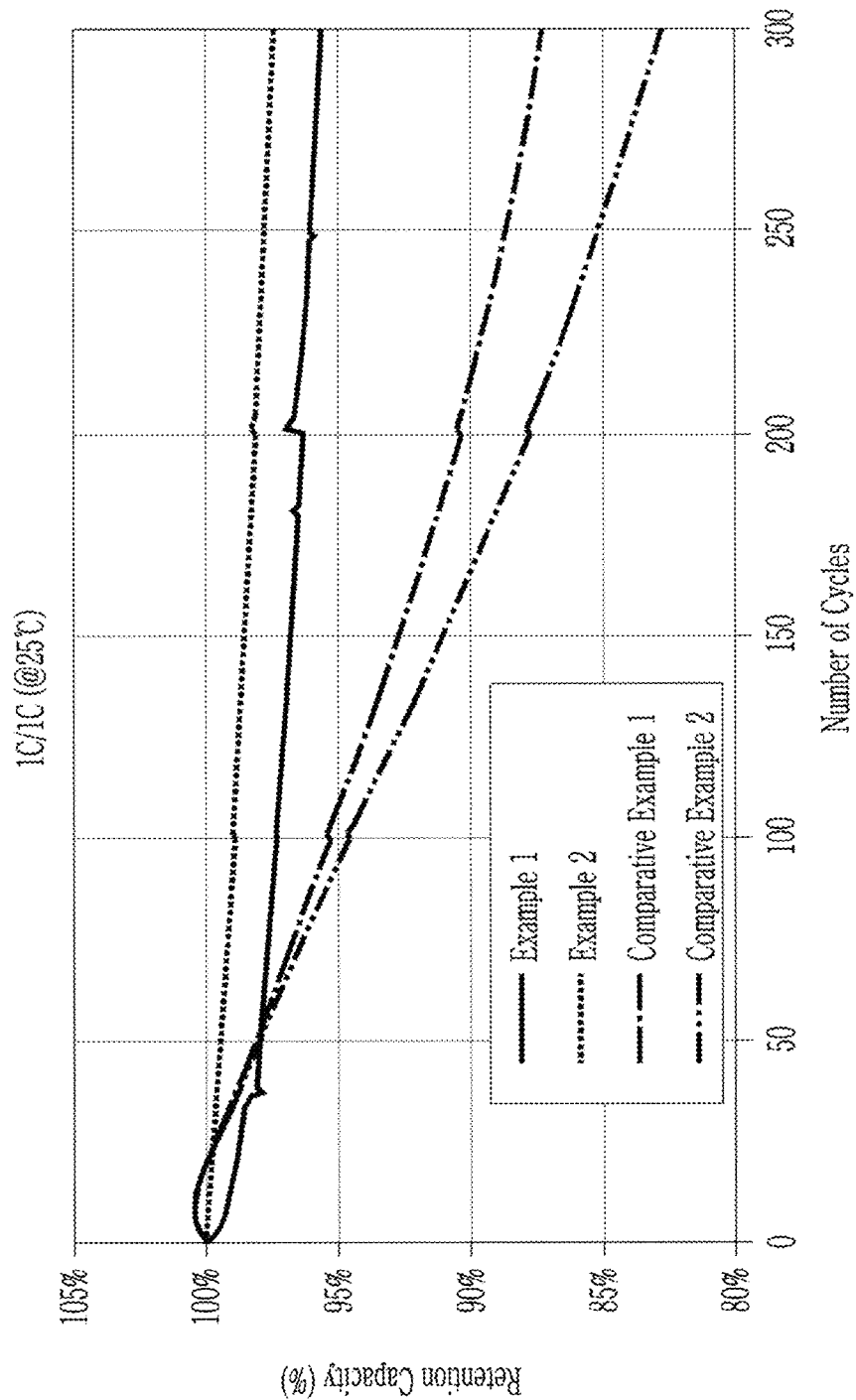
FIG. 5 is a graph showing cycle-lives of coin cells according to Example 1, Example 2, Comparative Example 1, and Comparative Example 2 at room temperature.

The coin cells after the 1$^{st}$ cycle in Evaluation Example 3 were charged under a constant current of 1.0 C up to 4.30 V (vs. Li), and subsequently charged with a cut off current at 0.05 C while maintaining a voltage of 4.30 V at 25° C. Subsequently, the coin cells were discharged to a voltage of 3.0 V (vs. Li) under a constant current of 1.0 C. This charge and discharge cycle was regarded as one cycle and repeated up to 300 cycles. The cell was allowed to rest for 10 minutes after each charge/discharge cycle. The charge and discharge experiment results were used to calculate a capacity retention at the 300$^{th}$ cycle according to Equation 2. The results of Examples 1 and 2 and Comparative Examples 1 and 2 are shown in FIG. 5.

Capacity retention at 300th cycle [%]=[Discharge capacity at 300th cycle/Discharge capacity at 1st cycle]×100   Equation 2

Examples 1 and 2 exhibited improved cycle-life characteristics by effectively removing unreacted residual lithium on the surface of a lithium nickel-based composite oxide compared with Comparative Examples 1 and 2.

Evaluation Example 5: Transmission Electron Microscopy Imaging

Figure 6A:
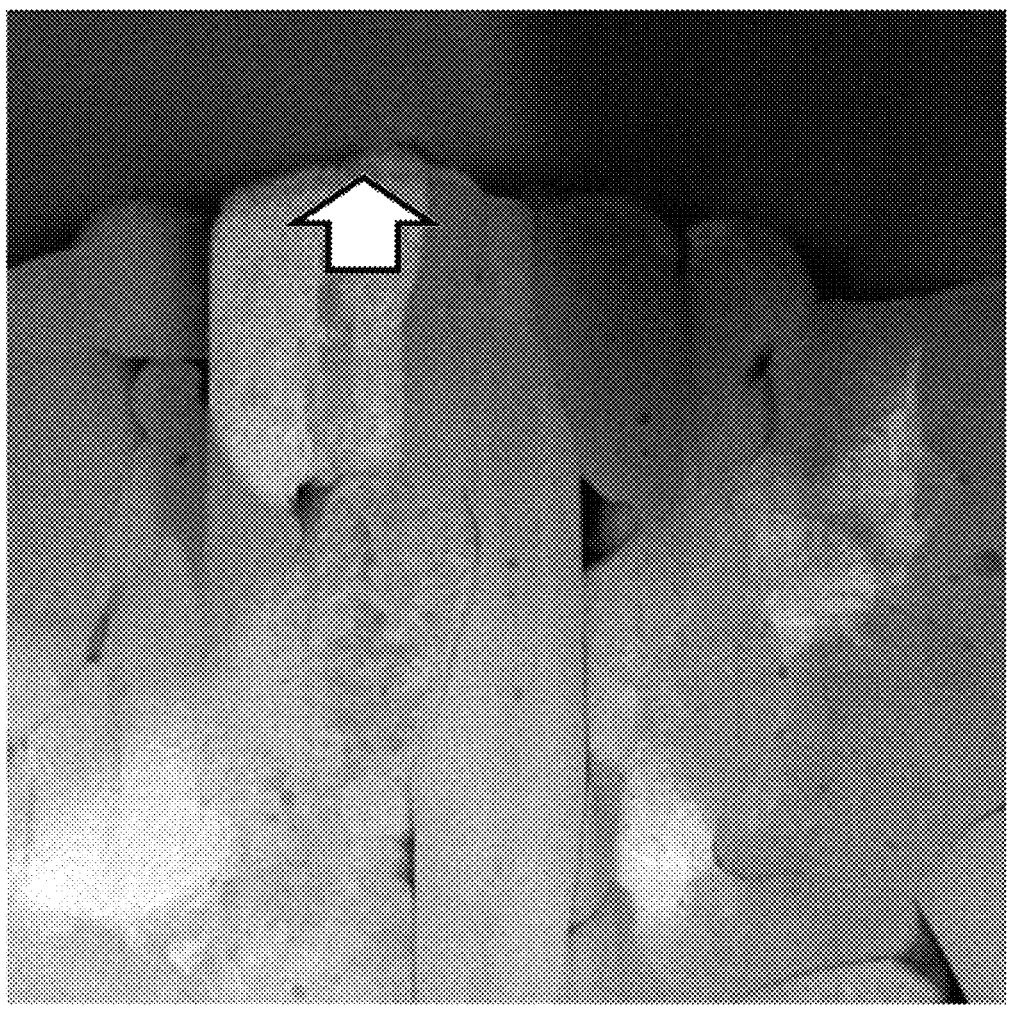
FIG. 6A is a cross-sectional transmission electron microscope (TEM) image of a secondary particle synthesized according to Comparative Example 3.
Figure 6B:
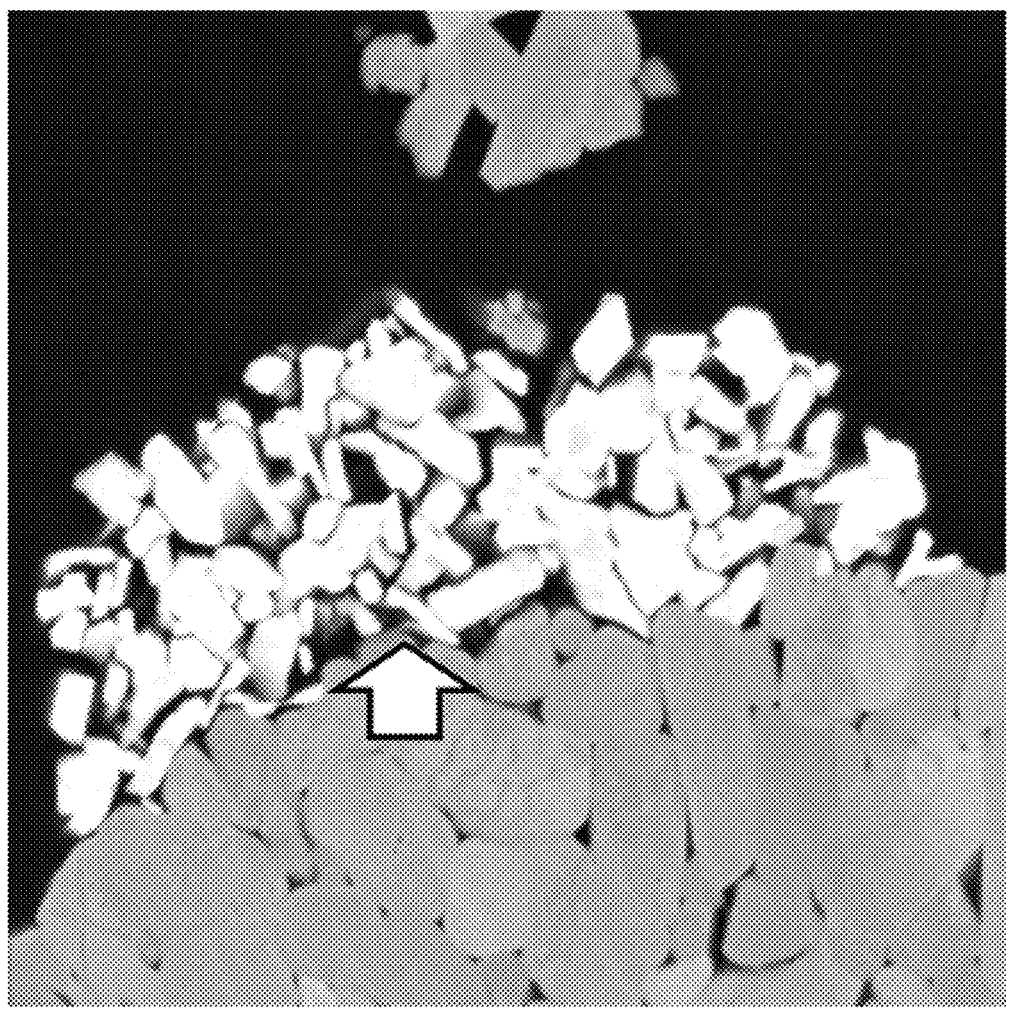
FIG. 6B is a cross-sectional TEM image of a secondary particle synthesized according to Comparative Example 2.
Figure 6C:
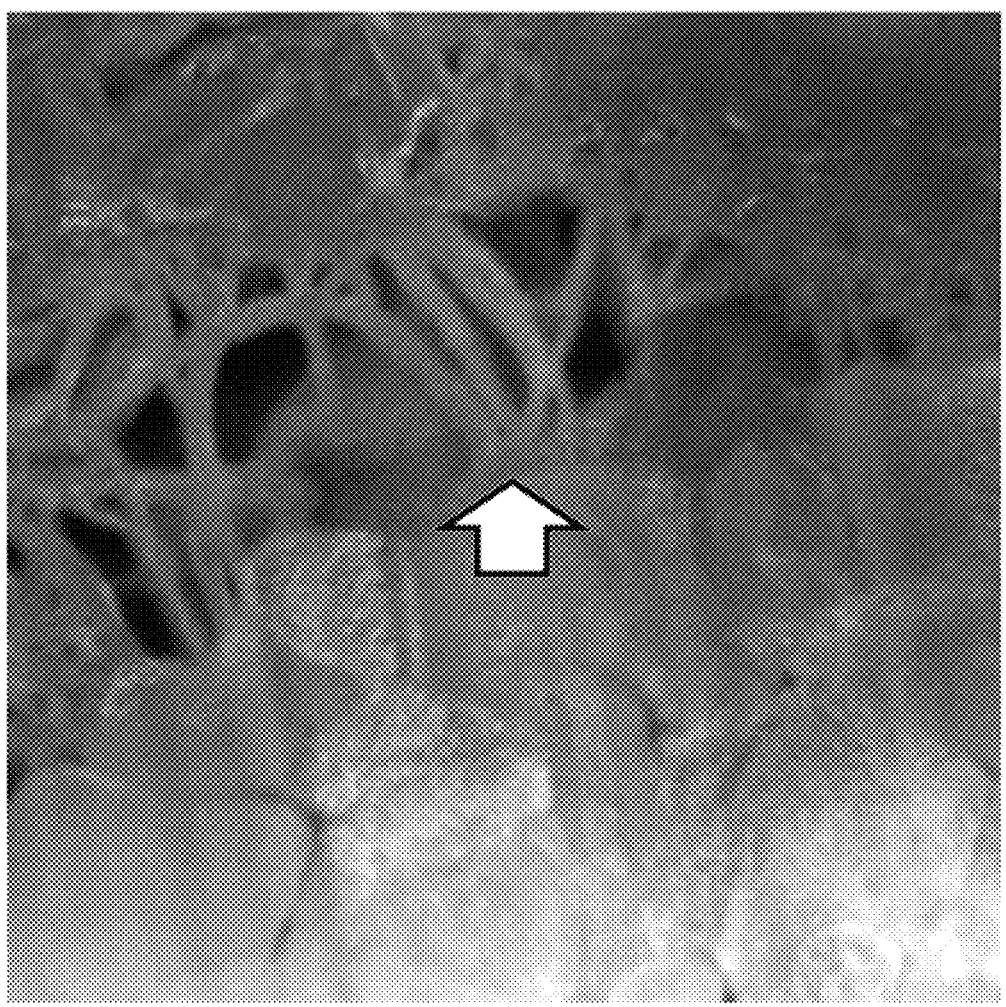
FIG. 6C is a cross-sectional TEM image of a secondary particle synthesized according to Example 2.

The positive active materials according to Example 2 and Comparative Examples 2 and 3 were analyzed using transmission electron microscopy (TEM). FIG. 6A is a cross-sectional TEM image of a secondary particle synthesized according to Comparative Example 3. FIG. 6B is a cross-sectional TEM image of a secondary particle synthesized according to Comparative Example 2. FIG. 6C is a cross-sectional TEM image of a secondary particle synthesized according to Example 2.

FIG. 6A shows that the particle of Comparative Example 3 includes a substantially uniform thin-film layer of Al$_2$O$_3$ coated on the surface (see arrow). FIG. 6B shows that the particle of Comparative Example 2 includes a coating in the form of a plurality of particles or particle-shaped structures. FIG. 6C shows that the particle of Example 2 includes a fiber-shaped coating layer including the fiber-shaped lithium manganese-based composite oxide according to embodiments of the present disclosure.

Figure 7A:
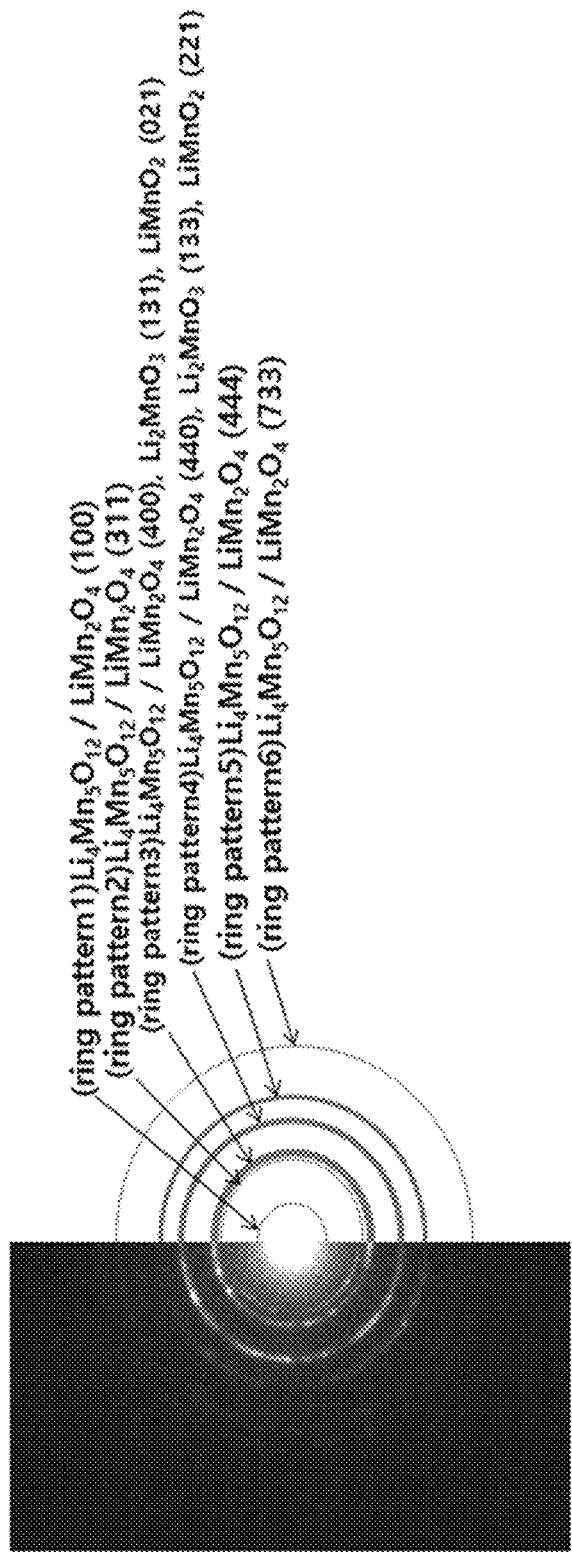
FIG. 7A is a TEM image of the selected area diffraction (SAD) pattern of the positive active material prepared according to Example 2 (as shown in FIG. 6C).

FIG. 7A is a TEM image of the selected area diffraction (SAD) pattern of the coating layer including fiber-shaped lithium manganese composite oxide in the positive active material of Example 2 (as shown in FIG. 6C). The crystal lattice structure of the lithium manganese composite oxide at the surface of the secondary particle may be identified by the interplanar distances in the ring diffraction pattern (e.g., the distance from the center to a ring) as shown in the TEM image. In FIG. 7A, since ring patterns 1, 2, 5, and 6 corresponding to cubic phases (e.g., $Li_4Mn_5O_{12}$, $LiMn_2O_4$) were found, the lithium manganese composite oxide was found to have or include a cubic crystal lattice structure.

Figure 7B:
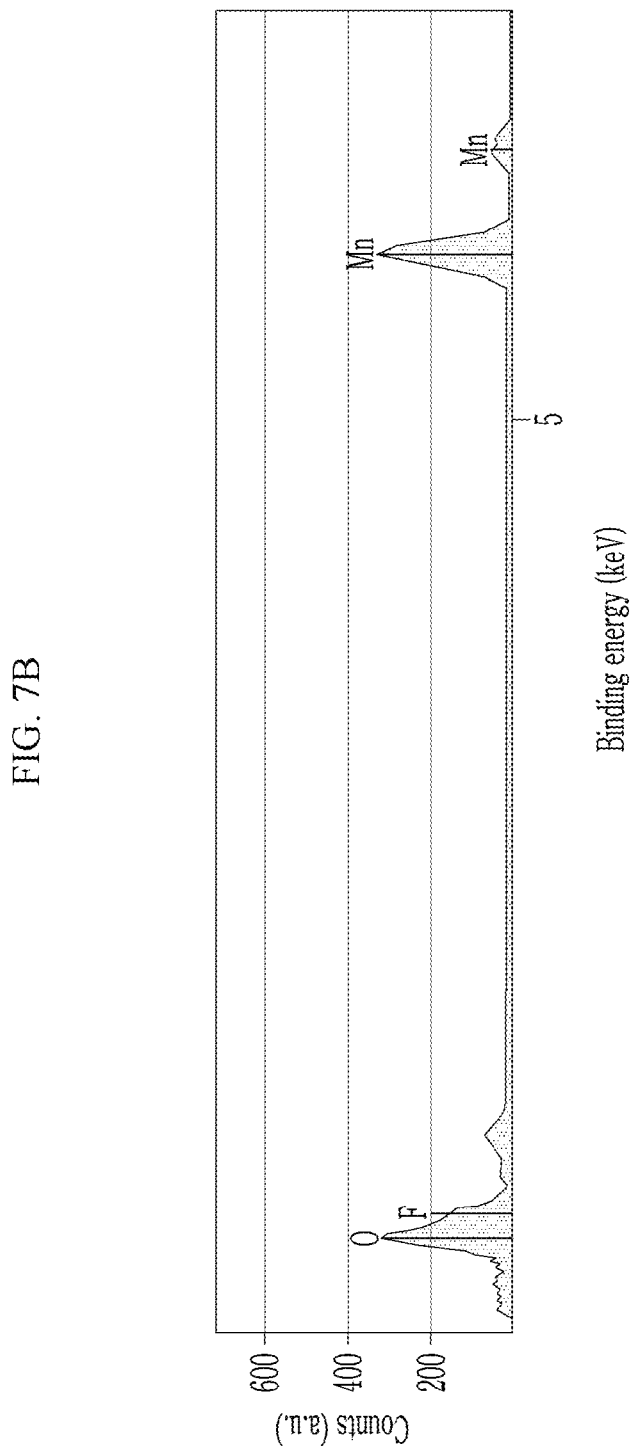
FIG. 7B is an energy dispersive X-ray spectroscopy (EDX) spectrum showing the elemental composition of the fiber-shaped lithium manganese composite oxide.

FIG. 7B is an energy dispersive X-ray spectroscopy (EDX) spectrum showing the elemental composition of the fiber-shaped lithium manganese composite oxide. The spectrum of FIG. 7B additionally confirms that the fiber includes Mn and O, consistent with a composition including lithium manganese composite oxide.

As used herein, the terms "use", "using", and "used" may be considered synonymous with the terms "utilize", "utilizing", and "utilized", respectively. Further, the use of "may" when describing embodiments of the present disclosure refers to "one or more embodiments of the present disclosure".

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims and equivalents thereof.

DESCRIPTION OF SOME OF THE SYMBOLS

1: positive active material
3: lithium nickel-based composite oxide
5: coating layer
7: fiber-shaped lithium manganese composite oxide
10: primary particle
20: secondary particle
31: rechargeable lithium battery
32: negative electrode
33: positive electrode
34: separator
35: battery case
36: cap assembly

What is claimed is:

1. A positive active material for a rechargeable lithium battery, the positive active material comprising:
  a lithium nickel-based composite oxide comprising a secondary particle in which a plurality of plate-shaped primary particles is agglomerated; and
  a coating layer comprising a fiber-shaped lithium manganese composite oxide,
  wherein the fiber-shaped lithium manganese composite oxide is attached to a surface of the lithium nickel-based composite oxide,
  wherein the positive active material comprises unreacted residual lithium on the surface of the lithium nickel-based composite oxide in an amount of less than or equal to about 1,300 ppm;
  wherein the residual lithium comprises LiOH and/or Li2CO3; and
  wherein a diameter of the fiber-shaped lithium manganese composite oxide is about 2 nm to about 50 nm.

2. The positive active material of claim 1, wherein the lithium manganese composite oxide is represented by Chemical Formula 1:

$$xLiMnO_2 \cdot yLi_4Mn_5O_{12} \cdot zLiMn_2O_4 \cdot (1-x-y-z)Li_2MnO_3 \quad \text{Chemical Formula 1}$$

wherein, in Chemical Formula 1, $0 \leq x < 1$, $0 \leq y < 1$, $0 \leq z < 1$, $0 < y+z < 1$ and $0 < x+y+z < 1$.

3. The positive active material of claim 1, wherein the lithium manganese composite oxide has a cubic crystal lattice structure and a monoclinic crystal lattice structure, or has the cubic crystal lattice structure, the monoclinic crystal lattice structure, and an orthorhombic crystal lattice structure.

4. The positive active material of claim 3, wherein:
  the cubic crystal lattice structure corresponds to at least one selected from $LiMn_2O_4$ and $Li_4Mn_5O_{12}$,
  the monoclinic crystal lattice structure corresponds to $Li_2MnO_3$, and
  the orthorhombic crystal lattice structure corresponds to $LiMnO_2$.

5. The positive active material of claim 1, wherein the coating layer has a thickness of about 2 nm to about 300 nm.

6. The positive active material of claim 1, wherein the lithium manganese composite oxide is in an amount of about 0.1 wt % to about 5 wt % based on a total weight of the positive active material.

7. The positive active material of claim 1, wherein the positive active material further comprises lithium manganese composite oxide particles,
  wherein the lithium manganese composite oxide particles each have an average particle diameter of less than or equal to 10 μm.

8. The positive active material of claim 1, wherein the secondary particle has a regular array structure in which (003) planes of the primary particles are oriented in a vertical direction with respect to an outermost surface of the secondary particle.

9. The positive active material of claim 1, wherein the secondary particle is in a single-centered radial arrangement structure having one center or a multi-centered radial arrangement structure having a plurality of centers.

10. The positive active material of claim 1, wherein the amount of unreacted residual lithium is less than or equal to about 1,000 ppm.

11. The positive active material of claim 1, wherein the lithium nickel-based composite oxide has a porosity of about 1% to about 8%.

12. The positive active material of claim 1, wherein the lithium nickel-based composite oxide has a specific surface area of about 0.3 m²/g to about 0.8 m²/g.

13. A method of preparing the positive active material of claim 1, the method comprising:
- mixing a metal hydroxide precursor and a lithium source to prepare a first mixture;
- first heat-treating the first mixture under a high temperature condition to prepare a first fired product comprising residual lithium;
- mixing the first fired product with a manganese-based oxide to prepare a second mixture; and
- second heat-treating the second mixture to prepare the positive active material.

14. The method of claim 13, wherein the first heat-treating is performed at about 650° C. to about 950° C.

15. The method of claim 13, wherein the manganese-based oxide is mixed in an amount of about 0.1 to about 5 parts by weight based on 100 parts by weight of the first fired product.

16. The method of claim 13, wherein the second mixture further comprises a second lithium source.

17. A rechargeable lithium battery comprising:
- a positive electrode comprising the positive active material of claim 1;
- a negative electrode; and
- an electrolyte between the positive electrode and the negative electrode.

\* \* \* \* \*

UNITED STATES PATENT AND TRADEMARK OFFICE
CERTIFICATE OF CORRECTION

PATENT NO. : 11,757,092 B2
APPLICATION NO. : 16/684057
DATED : September 12, 2023
INVENTOR(S) : Donggyu Chang et al.

It is certified that error appears in the above-identified patent and that said Letters Patent is hereby corrected as shown below:

In the Claims

In Column 22, Line 25, in Claim 2, in Chemical Formula 1, delete " $xLiMnO_2 \cdot yLi_4Mn_5O_{12} \cdot zLiMn_2O_4 \cdot (1-x-y-z)Li_2MnO_3$ Chemical Formula 1 " and Insert -- $xLiMnO_2 \cdot yLi_4Mn_5O_{12} \cdot zLiMn_2O_4 \cdot (1-x-y-z)Li_2MnO_3$, --

Signed and Sealed this
Nineteenth Day of December, 2023

Katherine Kelly Vidal
*Director of the United States Patent and Trademark Office*